(12) United States Patent
Wang et al.

(10) Patent No.: US 11,418,812 B2
(45) Date of Patent: Aug. 16, 2022

(54) PLACEMENT OF PARAMETER SETS AND SYNC SAMPLES IN VIDEO CODING

(71) Applicant: QUALCOMM Incorporated, San Diego, CA (US)

(72) Inventors: Ye-Kui Wang, San Diego, CA (US); Fnu Hendry, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 15/040,847

(22) Filed: Feb. 10, 2016

(65) Prior Publication Data

US 2016/0234526 A1 Aug. 11, 2016

Related U.S. Application Data

(60) Provisional application No. 62/115,013, filed on Feb. 11, 2015.

(51) Int. Cl.
*H04N 19/68* (2014.01)
*H04N 19/70* (2014.01)
*H04N 19/46* (2014.01)
*H04N 21/845* (2011.01)
*H04N 21/854* (2011.01)
(Continued)

(52) U.S. Cl.
CPC .............. *H04N 19/68* (2014.11); *H04N 19/46* (2014.11); *H04N 19/70* (2014.11); *H04N 21/8451* (2013.01); *H04N 21/8456* (2013.01); *H04N 21/85406* (2013.01); *H04N 19/107* (2014.11); *H04N 19/188* (2014.11)

(58) Field of Classification Search
CPC ...... H04N 19/70; H04N 19/61; H04N 19/176; H04N 19/46; H04N 19/44; H04N 19/597; H04N 19/30; H04N 19/52; H04N 19/187
See application file for complete search history.

(56) References Cited

U.S. PATENT DOCUMENTS 9,451,252 B2  9/2016 Chen et al.
9,596,463 B2  3/2017 Chong et al.
(Continued)

FOREIGN PATENT DOCUMENTS

WO  2013106705 A2  7/2013
WO  2013126706     8/2013
WO  2014001573 A1  1/2014

OTHER PUBLICATIONS

International Search Report and Written Opinion—PCT/US2016/017553—ISA/EPO—dated May 4, 2016 (13 pages).
(Continued)

*Primary Examiner* — Farhan Mahmud
(74) *Attorney, Agent, or Firm* — Campbell C. Chiang; Shumaker & Sieffert, P.A.

(57) ABSTRACT

File formats and parsing and coding of video data are defined to promote more efficient random accessibility of coded video data. Constraints may be imposed on placement of parameter sets and the definition of sync samples in video files. Parameter set data for video data may be coded, for a non-sync sample, only in the sample entry for the sample, the sample, a previous sample in decoding order that is a sync sample, or in a sample occurring in decoding order between the sample and the previous sample in decoding order that is a sync sample.

36 Claims, 6 Drawing Sheets

(51) Int. Cl.
H04N 19/169 (2014.01)
H04N 19/107 (2014.01)

(56) References Cited

U.S. PATENT DOCUMENTS

| | | | | |
|---|---|---|---|---|
| 2012/0230433 | A1* | 9/2012 | Chen | H04N 19/503 375/240.25 |
| 2013/0195171 | A1 | 8/2013 | Wang et al. | |
| 2013/0287366 | A1 | 10/2013 | Wang | |
| 2014/0098860 | A1 | 4/2014 | Wang | |
| 2015/0208095 | A1* | 7/2015 | Schierl | H04N 19/70 375/240.28 |

OTHER PUBLICATIONS

ISO/IEC: "Information technology—Coding of audio-visual objects—Part 15: Carriage of NAL unit structured video in the ISO Base Media File Format", ISO/IEC 14496-15:2013(E), vol. 2013, No. ISO/IEC 14496-15:2013(E) m31213, Oct. 24, 2013 (Oct. 24, 2013), pp. 1-134, XP030059666.
Wang Y K., et al., "On the concept of random access point in 14496-12 and 14496-15", 111. MPEG meeting, Feb. 6, 2015-Feb. 20, 2015, Geneva, (Motion Picture Expert Group Or ISO/IEC JTC1/SC29/WG11), No. m35922, Feb. 11, 2015 (Feb. 11, 2015), pp. 1-4, XP030064290, the whole document.
Response to Written Opinion dated May 4, 2016 from corresponding PCT Application Serial No. PCT/US2016/017553 filed on Dec. 9, 2016 (20 pages).
Second Written Opinion dated Jan. 16, 2017 from corresponding PCT Application Serial No. PCT/US2016/017553 (7 pages).
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29/WG11 and ITU-T SG.16) JCTVC-F803_d2, Oct. 4, 2011, 226 pp.
Bross et al., "WD5: Working Draft 5 of High-Efficiency Video Coding," 7th Meeting: Geneva, Switzerland, Nov. 21 through 30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (For FDIS & Last Call)," 12th Meeting: Geneva, CH, Jan. 14 through 23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.261, Line Transmission of Non-Telephone Signals, Video Codec for Audiovisual Services At p x 64 kbits, The International Telecommunication Union, Mar. 1993, 29 pp.
ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
ITU-T H.264, Series H: Audiovisual and Multimedia Systems, Infrastructure of audiovisual services—Coding of moving video, Advanced video coding for generic audiovisual services, The International Telecommunication Union, Mar. 2005, 343 pp.
ITU-T H.223, Series H: Audiovisual and Multimedia Systems, Infrastructure of audiovisual services—Transmission multiplexing and synchronization, Multiplexing protocol for low bit rate multimedia communication, The International Telecommunication Union, Jul. 2001, 74 pp.
Hannuksela et al., "Isolated Regions in Video Coding," IEEE Transactions on Multimedia, vol. 6, No. 2, Apr. 2004, pp. 259-267.
3GPP TS 26.244 V9.1.0, 3rd Generation Partnership Project; Technical Specification Group Services and System Aspects; Transparent end-to-end packet switched streaming service (PSS); 3GPP file format (3GP), (Release 12), Dec. 2013, 61 pp.
"International Standard ISO/IEC 14496-12, Information Technology—Coding of audio-visual objects—Part 12: ISO base media file format," Third Edition, Oct. 15, 2008, 120 pp.
"International Standard ISO/IEC 14496-14, Information Technology—Coding of audio-visual objects—Part 14: MP4 file format," First Edition, Nov. 15, 2003, 18 pp.
"International Standard ISO/IEC 14496-15, Information Technology—Coding of audio-visual objects—Part 15: Carriage of network abstraction layer (NAL) unit structured video in ISO base media file format," Third Edition, Jul. 1, 2014, 124 pp.
International Preliminary Report on Patentability—PCT/US2016/017553—ISA/EPO—dated May 2, 2017 (9 pages).
Murakami T, et al., "High Efficiency Video Coding," Ohmsha, Feb. 25, 2013, Ver. 1, pp. 74-85.
Wang Y-K., et al., "WD2 of ISO/IEC 14496-15 2013/AMD1 Enhanced Support of HEVC and MVC+D", ISO/IEC JTC1/SC29/WG11 w14123, Jan. 2014, part. 1-4, URL: https://mpeg.chiariglione.org/standards/mpeg-4/carriage-nal-unit-structured-video-iso-base-media-file-format/wd-isoiec-14496, 18 Pages.
Okubo S., "3rd Revision of H.264/AVC Textbook," Impress R & D, Jan. 1, 2009, 1st Edition, pp. 196-199.

(56) References Cited

OTHER PUBLICATIONS

Wang, et al., "File format for HEVC multi-layer extensions," 106. MPEG meeting; Oct. 28, 2013-Nov. 1, 2013; Geneva, ISO/IEC JTC1/SC29/WG11 MPEG2013/M31213, Oct. 28-Nov. 1, 2013, 139 pp.

* cited by examiner

PLACEMENT OF PARAMETER SETS AND SYNC SAMPLES IN VIDEO CODING

This application claims the benefit of U.S. Provisional Application No. 62/115,013, filed Feb. 11, 2015, the entire contents of which are incorporated by reference herein.

TECHNICAL FIELD

This disclosure relates to video coding and compression, and signaling of data associated with compressed video in a bitstream.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

Techniques of this disclosure relate to definition of file formats and parsing and/or coding of video data. For example, in video coding, a parameter set may contain sequence-level header information or infrequently changing picture-level information that does need not to be repeated for each sequence or picture, thereby increasing coding efficiency. Aspects of this disclosure may enable efficient random accessibility of coded video data by imposing constraints on placement of parameter sets in a video bitstream and defining sync samples and non-sync samples in video files. For example, parameter set data for a video data may be coded, for a sync sample, only in the sample entry for the sample or the sample itself. Parameter set data for video data may be coded, for a non-sync sample, only in a sample entry for the sample, the sample itself, a previous sample in decoding order that is a sync sample, or in a sample occurring in decoding order between the non-sync sample and the previous sample in decoding order that is a sync sample.

In an example, a method of decoding video data includes determining whether a sample of video data is a sync sample, and based on determining that the sample is not a sync sample, determining parameter set data for the video data only from a sample entry for the sample, the sample, a previous sample in decoding order that is a sync sample, or from a sample occurring in decoding order between the sample and the previous sample in decoding order that is a sync sample.

In another example, a method for encoding video data comprises determining whether a sample of video data is a sync sample, and based on determining that the sample is not a sync sample, encoding parameter set data for the video data only in a sample entry for the sample, the sample, a previous sample in decoding order that is a sync sample, or in a sample occurring in decoding order between the sample and the previous sample in decoding order that is a sync sample.

In another example, a device for decoding video data comprises a memory configured to store video data, and one or more processors, the one or more processors configured to determine whether a sample of the video data is a sync sample, and based on determining that the sample is not a sync sample, determine parameter set data for the video data only from a sample entry for the sample, the sample, a previous sample in decoding order that is a sync sample, or from a sample occurring in decoding order between the sample and the previous sample in decoding order that is a sync sample.

In another example, a device for encoding video data comprises a memory configured to store video data, and one or more processors configured to determine whether a sample of the video data is a sync sample, and based on determining that the sample is not a sync sample, include parameter set data for the video data only in a sample entry for the sample, the sample, a previous sample in decoding order that is a sync sample, or in a sample occurring in decoding order between the sample and the previous sample in decoding order that is a sync sample.

In another example, a device for decoding video data comprises means for determining whether a sample of video data is a sync sample, and means for, based on determining that the sample is not a sync sample, determining parameter set data for the video data only from a sample entry for the sample, the sample, a previous sample in decoding order that is a sync sample, or from a sample occurring in decoding order between the sample and the previous sample in decoding order that is a sync sample.

In another example, a device for encoding video data comprises means for determining whether a sample of video data is a sync sample, and means for, based on determining that the sample is not a sync sample, including parameter set data for the video data only in a sample entry for the sample, the sample, a previous sample in decoding order that is a sync sample, or in a sample occurring in decoding order between the sample and the previous sample in decoding order that is a sync sample.

In another example, a non-transitory computer-readable medium comprises instructions stored thereon that, when executed, cause one or more processors to determine whether a sample of video data is a sync sample, and based on determining that the sample is not a sync sample, determine parameter set data for the video data only from a sample entry for the sample, the sample, a previous sample in decoding order that is a sync sample, or from a sample occurring in decoding order between the sample and the previous sample in decoding order that is a sync sample.

In another example, a non-transitory computer-readable medium comprises instructions stored thereon that, when executed, cause one or more processors to determine whether a sample of video data is a sync sample, and based on determining that the sample is not a sync sample, include parameter set data for the video data only in a sample entry for the sample, the sample, a previous sample in decoding order that is a sync sample, or in a sample occurring in decoding order between the sample and the previous sample in decoding order that is a sync sample.

The details of one or more examples of the disclosure are set forth in the accompanying drawings and the description below. Other features, objects, and advantages will be apparent from the description, drawings, and claims.

DETAILED DESCRIPTION

Figure 1:
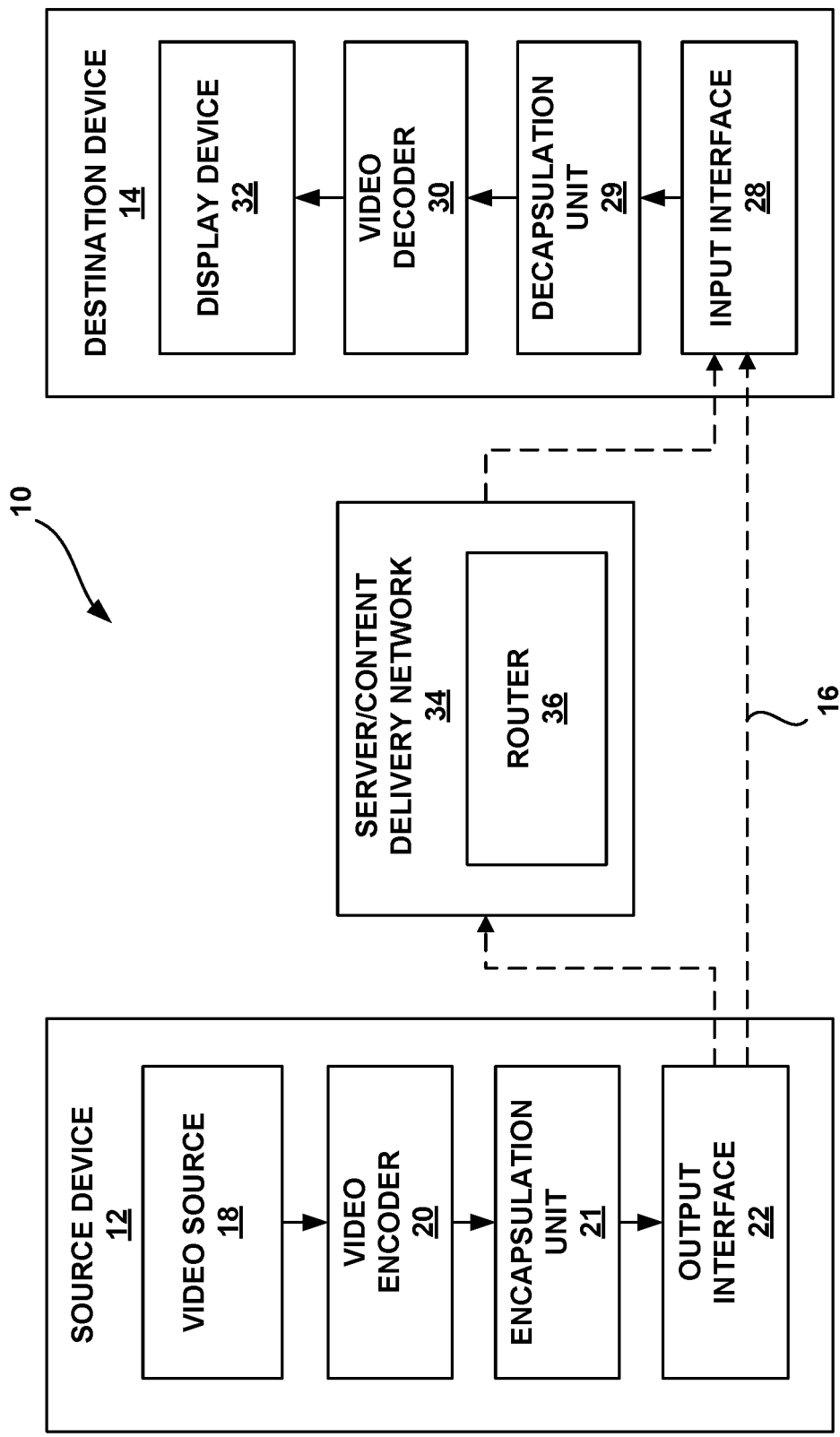
FIG. 1 is a block diagram illustrating an example video encoding and decoding system that may utilize the techniques described in this disclosure.

Techniques of this disclosure relate to storage of video contents in file formats. More specifically, the techniques may enable efficient random accessibility of coded video data through forcing constraints on placement of parameter sets and the definition of sync samples and non-sync samples in video files.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC).

Random access may refer to a decoding of a video bitstream starting from a coded picture that is not the first coded picture in the bitstream. Random access to a bitstream is provided in many video applications, such as broadcasting and streaming, e.g., for users to tune-in to a program anytime, to switch between different channels, to jump to specific parts of the video, or to switch to a different bitstream for stream adaptation (e.g., adaptation of the bit rate, frame rate, spatial resolution, and so on). This feature is enabled by inserting random access pictures or random access points, many times in regular intervals, into the video bitstream.

Instantaneous decoding refresh (IDR) pictures as specified in AVC or HEVC can be used for random access. In general, an IDR picture may include intra-coded data and may cause the pictures of a decoded picture buffer to be cleared and/or marked as being unused for reference. However, since pictures following an IDR picture in decoding order cannot use pictures decoded prior to the IDR picture as reference, bitstreams relying on IDR pictures for random access can have significantly lower coding efficiency.

To improve coding efficiency, the concept of clean random access (CRA) pictures was introduced in HEVC to allow pictures that follow a CRA picture in decoding order but precede it in output order to use pictures decoded before the CRA picture as reference. Pictures that follow a CRA picture in decoding order but precede the CRA picture in output order are referred to as leading pictures associated with the CRA picture (or leading pictures of the CRA picture). The leading pictures of a CRA picture are correctly decodable if the decoding starts from an IDR or CRA picture before the current CRA picture. However, the leading pictures of a CRA picture may be non-decodable when random access from the CRA picture occurs; hence the leading pictures are typically discarded during random access decoding. To prevent error propagation from reference pictures that may not be available depending on where the decoding starts, all pictures that follow a CRA picture both in decoding order and output order may not use any picture that precedes the CRA picture either in decoding order or output order (which includes the leading pictures) as reference.

The concept of broken link access (BLA) picture was further introduced in HEVC after the introduction of CRA pictures and is based on the concept of CRA pictures. A BLA picture typically originates from bitstream splicing (as described in greater detail below) at the position of a CRA picture, and in the spliced bitstream the splicing point CRA picture is changed to a BLA picture.

IDR pictures, CRA pictures and BLA pictures are collectively referred to as random access point (RAP) pictures. IDR pictures correspond to the so-called closed group of pictures (GOP) based RAPs, while CRA and BLA pictures correspond to the conventionally so-called open group of pictures based RAPs.

One difference between BLA pictures and CRA pictures is that, for a CRA picture, the associated leading pictures are correctly decodable if the decoding starts from a RAP picture before the CRA picture in decoding order, and may be non-correctly-decodable when random access from the CRA picture occurs (i.e., when the decoding starts from the CRA picture, or in other words, when the CRA picture is the first picture in the bitstream). For a BLA picture, the associated leading pictures may be non-decodable in all cases, even when the decoding starts from a RAP picture before the BLA picture in decoding order.

Randomly accessing a video bitstream may also start from a gradual decoding refresh (GDR) picture, which is not intra coded, but after a certain number of pictures being decoded, all the following pictures in decoding order can be correctly decoded. For a review of video techniques to achieve GDR, see this paper: Miska M. Hannuksela, Ye-Kui Wang, and Moncef Gabbouj, "Isolated regions in video coding," IEEE Transactions on Multimedia, vol. 6, no. 2, pp. 259-267, Apr. 2004.

In some examples, randomly accessing a video bitstream may be performed during bitstream splicing. Bitstream splicing may refer to the concatenation of two or more bitstreams or parts thereof. For example, a first bitstream may be appended by a second bitstream, possibly with some modifications to either one or both of the bitstreams to generate a spliced bitstream. The first coded picture in the second bitstream is also referred to as the splicing point. Therefore, pictures occurring after the splicing point in the spliced bitstream were originated from the second bitstream, while pictures preceding the splicing point in the spliced bitstream were originated from the first bitstream.

Splicing of bitstreams may be performed by bitstream splicers. Bitstream splicers are often lightweight and may be much less intelligent than encoders. For example, splicers may not be equipped with entropy decoding and encoding capabilities. In some examples, a bitstream splicer may be included in a server or other content preparation device. Bitstream switching may be used in adaptive streaming environments. A bitstream switching operation at a certain picture in the switch-to bitstream is effectively a bitstream splicing operation wherein the splicing point is the bitstream switching point, i.e., the first picture from the switch-to bitstream.

In some instances, coded video data may be stored in a particular file format. Example file format standards include ISO base media file format (ISOBMFF, ISO/IEC 14496-12). The ISOBMFF may be used as the basis for many codec encapsulation formats, such as the AVC file format, as well as for many multimedia container formats, such as the MPEG-4 file format, the 3GPP file format (3GP), and the DVB file format. For example, other file formats derived from the ISOBMFF may include the MPEG-4 file format (ISO/IEC 14496-14), the 3GPP file format (3GPP TS 26.244) and the AVC file format (ISO/IEC 14496-15).

In addition to continuous media, such as audio and video, static media, such as images, as well as metadata can be stored in a file conforming to ISOBMFF. Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams.

A box may refer to an elementary syntax structure in the ISOBMFF, including a four-character coded box type, the byte count of the box, and the payload. An ISOBMFF file consists of a sequence of boxes, and boxes may contain other boxes. A Movie box ("moov") contains the metadata for the continuous media streams present in the file, each one represented in the file as a track.

The metadata for a track is enclosed in a Track box ("trak"), while the media content of a track is either enclosed in a Media Data box ("mdat") or directly in a separate file.

The media content for tracks consists of a sequence of samples, such as audio or video access units. An access unit is, generally, a unit of data including coded picture data for a common time instance. A sample is an access unit as defined by a particular specification, such as the video coding specifications described herein. A sample entry may provide a description of a corresponding sample.

The ISOBMFF specifies the following types of tracks: a media track, which contains an elementary media stream, a hint track, which either includes media transmission instructions or represents a received packet stream, and a timed metadata track, which comprises time-synchronized metadata.

Although originally designed for storage, the ISOBMFF has proven to be valuable for streaming, e.g., for progressive download or DASH. For streaming purposes, the movie fragments defined in ISOBMFF may be used. The metadata for each track includes a list of sample description entries (also referred to as sample entries), each providing the coding or encapsulation format used in the track and the initialization data needed for processing that format. Each sample may be associated with one of the sample description entries of the track. As described herein, a sample may correspond to an access unit in video coding. For example, a sample may correspond to a unit of video data that includes all view components (e.g., all network abstraction layer (NAL) units) for a common time instance. A parameter set sample may be a sample in a parameter set stream that includes parameter set NAL units that are to be considered as present in a video elementary stream at the same instance in time.

The ISOBMFF enables sample-specific metadata to be specified with various mechanisms. Specific boxes within the Sample Table box ("stbl") have been standardized to respond to common needs. For example, a Sync Sample box ("stss") is used to list random access samples (as described below) of the track. The sample grouping mechanism enables mapping of samples according to a four-character grouping type into groups of samples sharing the same property specified as a sample group description entry in the file. Several grouping types have been specified in the ISOBMFF.

The ISOBMFF specification specifies six types of Stream Access Points (SAPs) for use with DASH. The first two SAP types (types 1 and 2), correspond to IDR pictures in H.264/AVC and HEVC. The third SAP type (type 3) corresponds to open-GOP random access points; hence BLA or CRA pictures in HEVC. The fourth SAP type (type 4) corresponds to GDR random access points.

However, the phrase "random access point" may have multiple and potentially inconsistent definitions throughout the ISOBMFF. For example, a video coder (e.g., a video encoder or video decoder) conforming to one portion of the ISOBMFF may determine whether a sample is a random access point differently than a video coder conforming to another portion of the ISOBMFF. When a random access point is interpreted differently by different devices (e.g., a device responsible for encoding/packaging video data and a device responsible for parsing/decoding video data), a file may not be delivered and/or played back properly.

For example, because there are different interpretations of the term "random access point" in the ISOBMFF, the constraint on placement of parameter sets in the AVC file format, SVC file format, MVC file format, and HEVC file format can have different interpretations. Accordingly, a file may be considered as conforming to the ISOBMFF by some implementations but not by other implementations. Due to such inconsistencies, a video coder may not be able to accurately and/or consistently determine whether conditions associated with random access points have been satisfied for a particular bitstream, such as conditions associated with parameter sets. In some cases, a file may be rejected to be requested or played back.

The techniques of this disclosure may address one or more of the issues discussed above. For example, according to aspects of this disclosure, the constraints on placement of parameter sets in the AVC file format, SVC file format, MVC file format, and HEVC file format may be updated with respect to the ISOBMFF, such that the above-noted interoperability issue is resolved.

For example, according to aspects of this disclosure, a video coder (e.g., a video encoder or video decoder) may determine whether a sample of video data (e.g., an access unit that includes at least one coded picture for a particular instance in time) is a sync sample. In general, a sync sample is a sample that may be used for synchronization (e.g., during bitstream switching or splicing). A sample may be considered a sync sample if conditions for random access are met, as described in greater detail below, such that a video decoder may begin properly decoding the sync sample and all samples following the sync sample in decoding order.

According to aspects of this disclosure, based on determining that the sample is not a sync sample, a video decoder may decode parameter set data for the video data only in the sample entry for the sample or in a sample occurring in decoding order between the sample and a previous sample in decoding order that is a sync sample, inclusive. That is, the video decoder may determine parameter set data needed for decoding the video data of the non-sync sample only from the sample entry for the non-sync sample, the non-sync sample itself, a previous sync sample in decoding order, or one or more samples between the previous sync sample and the non-sync sample. For example, in the event that a sample is not a sync sample and parameter set data is included in any other location of the bitstream than those specified, the video decoder 30 may reject the file as non-conforming and may not decode the sample. As described in greater detail below, a parameter set may contain sequence-level header information or infrequently changing picture-level information that does need not to be repeated for each sequence or picture (thereby increasing coding efficiency).

FIG. 1 is a block diagram illustrating an example video encoding and decoding system 10 that may utilize techniques for determining one or more target output layers, according to aspects of this disclosure. As shown in FIG. 1, system 10 includes a source device 12 that provides encoded video data to be decoded at a later time by a destination device 14. In particular, source device 12 provides the video data to destination device 14 via a computer-readable medium 16.

Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, encapsulation unit 21, and output interface 22. Destination device 14 includes input interface 28, decapsulation unit 29, video decoder 30, and display device 32. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques described herein may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor.

Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20.

Video encoder 20 generally produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. In some examples, video encoder 20 may include packetizers for forming PES packets from encoded data. In other examples, video encoder 20 may interface with respective packetizers for forming PES packets from encoded data. In still other examples, video encoder 20 may include packetizers for forming PES packets from encoded audio and video data.

Encapsulation unit 21 receives PES packets for elementary streams of a representation from video encoder 20 and forms corresponding NAL units from the PES packets. In the examples of H.264/AVC and HEVC, coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

As noted above, an access unit is, generally, a unit of data including all view components (e.g., all NAL units) for a common time instance. The view components of an access unit may be intended to be output together (i.e., output substantially simultaneously), where outputting a picture generally involves transferring pictures from a decoded picture buffer (DPB) (e.g., storing pictures from the DPB to an external memory, sending the pictures from the DPB to a display, removing pictures from the DPB, or the like).

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 21 may form a manifest file, such as a media presentation descriptor (MPD) that describes characteristics of the representations. Encapsulation unit 21 may format the MPD according to extensible markup language (XML).

Output interface 22 may output the encoded video onto a computer-readable medium 16. Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 may receive data of segments of a particular representation. Decapsulation unit 29 may decapsulate elements of a video file into constituent PES streams, depacketize the PES streams to retrieve encoded data, and send the encoded data to video decoder 30. Video decoder 30 decodes encoded video data and sends the decoded video data, which may include a plurality of views of a stream, to display device 32. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20, encapsulation unit 21, decapsulation unit 29, and video decoder 30, post-processing entity 27 and network entity 79 described below, and other components described in this disclosure, each may be implemented as any of a variety of suitable integrated circuit processing circuitry, as applicable, such as one or more processors, including one or more microprocessors, digital signal processors (DSPs), application specific integrated circuits (ASICs), field programmable gate arrays (FPGAs), discrete logic circuitry, software, hardware, firmware or any combinations thereof. Hence, the components of video encoder 20, encapsulation unit 21, decapsulation unit 29, and video decoder 30, as well as post-processing entity 27 and network entity 79, as described in this disclosure, may be formed by any of a variety of integrated processing circuitry comprising one or more processors implemented as fixed hardware processing circuitry, programmable processing circuitry and/or a combination of both. Each of video encoder 20 and video decoder 30 may be included in one or more encoders or decoders, either of which may be integrated as part of a combined video encoder/decoder (CODEC). An apparatus including video encoder 20, video decoder 30, encapsulation unit 21, and/or decapsulation unit 29 may comprise an integrated circuit, a microprocessor, and/or a wireless communication device, such as a cellular telephone.

This disclosure may generally refer to video encoder 20 (and/or server/content delivery network 34) "signaling" certain information to another device, such as video decoder 30. It should be understood, however, that video encoder 20 and/or a server/content delivery network 34 may signal information by associating certain syntax elements with various encoded portions of video data. That is, video encoder 20 and/or server/content delivery network 34 may "signal" data by storing certain syntax elements to headers of various encoded portions of video data. In some cases, such syntax elements may be encoded and stored (e.g., stored to storage device 24) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a storage medium at the time of encoding, which then may be retrieved by a decoding device at any time after being stored to this medium.

Video encoder 20 and video decoder 30 may operate according to a video compression standard, such as the ITU-T H.264 standard, alternatively referred to as MPEG-4, Part 10, Advanced Video Coding (AVC), or extensions of such standards (e.g., Multiview Video Coding (MVC) or Scalable Video Coding (SVC)). The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

In other examples, video encoder 20 and video decoder 30 may operate according to the HEVC video coding standard, also known as ITU-T H.265 and ISO/IEC 23008-2, or extensions of HEVC (scalable high-efficiency video coding (SHVC) or multiview high efficiency video coding (MV-HEVC)). The finalized HEVC standard document is published as "ITU-T H.265, SERIES H: AUDIOVISUAL AND MULTIMEDIA SYSTEMS Infrastructure of audiovisual services—Coding of moving video—High efficiency video coding," Telecommunication Standardization Sector of International Telecommunication Union (ITU), April 2013.

HEVC allows a video picture to be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block.

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. Following quantization, the video encoder may scan the transform coefficients, producing a one-dimensional vector from the two-dimensional matrix including the quantized transform coefficients.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

In the example shown in FIG. 1, system 10 also includes server/content delivery network 34 having router 36. In some examples, source device 12 may communicate with server/content delivery network 34 via a variety of wireless and/or wired transmission or storage media, as described above. Moreover, while shown separately in the example of FIG. 1, in some examples, source device 12 and server/content delivery network 34 comprise the same device. Server/content delivery network 34 may store one or more versions of coded video data (from video encoder 20 of source device 12), and may make such coded video data available for access by destination device 14 and video decoder 30.

In some examples, router 36 may be responsible for providing coded video data to destination device 14 in a requested format. In other examples, encapsulation unit 21 may be responsible for encapsulating encoded video data in a particular format. File format standards include ISO base media file format (ISOBMFF, ISO/IEC 14496-12) and other formats derived from the ISOBMFF, including MPEG-4 file format (ISO/IEC 14496-14), 3GPP file format (3GPP TS 26.244) and AVC file format (ISO/IEC 14496-15). In addition, server/content delivery network 34 may be responsible for splicing and/or switching bitstreams.

As described in greater detail with respect to FIG. 4 below, a box may refer to the syntax structure in the ISOBMFF, including a four-character coded box type, the byte count of the box, and the payload. An ISOBMFF file consists of a sequence of boxes, and boxes may contain other boxes. A Movie box ("moov") contains the metadata for the continuous media streams present in the file, each one represented in the file as a track.

The metadata for a track is enclosed in a Track box ("trak"), while the media content of a track is either enclosed in a Media Data box ("mdat") or directly in a separate file. The media content for tracks consists of a sequence of samples, such as audio or video access units. An access unit is, generally, a unit of data including coded picture data for a common time instance. A sample is an access unit as defined by a particular specification, such as the video coding specifications described herein.

A sample entry may provide a description of a corresponding sample. For example, a sample entry may include a four character code that describes a characteristic of the corresponding sample, such as a format of the corresponding sample. Example sample entries for AVC and SVC tracks are included in the table below:

| Sample entry name | With configuration records | Meaning |
|---|---|---|
| avc1 or avc3 | AVC configuration only | A plain AVC track without SVC NAL units; Extractors, aggregators, and tier grouping shall not be present |
| avc1 or avc3 | AVC and SVC configurations | An SVC track with both AVC and SVC NAL units; Extractors and aggregators may be present; Extractors shall not reference AVC NAL units; Aggregators shall not contain but may reference AVC NAL units; tier grouping may be present |
| avc2 or avc4 | AVC configuration only | A plain AVC track without SVC NAL units; Extractors may be present and used to reference AVC NAL units; Aggregators may be present to contain and reference AVC NAL units; Tier grouping may be present |
| svc1 or svc2 | SVC configuration | An SVC track without AVC NAL units; Extractors may be present and used to reference both AVC and SVC NAL units; Aggregators may be present to contain and reference both AVC and SVC NAL units; tier grouping may be present |

The table above is for purposes of illustration only. A variety of other sample entries may be used to describe other types of samples.

Video encoder 20 (or encapsulation unit 21) may generate and video decoder 30 (or decapsulation unit 29) may receive certain parameter sets, which may be used when decoding video data. For example, as noted above, parameter sets may include an SPS, PPS, or VPS, which improve efficiency by separately signaling infrequently changing information. With respect to the ISOBMFF file format, a parameter set sample may be a sample in a parameter set stream that includes parameter set NAL units that are to be considered as present in a video elementary stream at the same instance in time. There may also be a parameter set sample at each point a parameter set is updated. Each parameter set may contain the sequence and picture parameter sets needed to decode the relevant section of the video elementary stream. A sync sample in a parameter set track may indicate that all parameter sets needed from that decoding time forward in the video elementary stream are in that or succeeding parameter stream samples.

However, in some instances, decapsulation unit 29 and/or video decoder 30 may not properly identify and decode parameter sets. For example, as noted above, because there are different interpretations of the term random access point (RAP) in the ISOBMFF, the constraint on placement of parameter sets in the AVC file format, SVC file format, MVC file format, and HEVC file format can have different interpretations, and a file may be considered as conforming by some implementations but not by other implementations. When a random access point is interpreted differently by different devices (e.g., where different devices may include a device responsible for encoding/packaging video data and a device responsible for parsing/decoding video data), a file may not be delivered and/or played back properly.

For example, in the ISOBMFF, a video coder may interpret a RAP in at least three different ways, depending on the particular portion of the ISOBMFF to which the video coder conforms. In a first example, a RAP may correspond to any of SAP types 1, 2, or 3, but not other SAP types. For example, a portion of Section 3.1.11 of the ISOBMFF is reproduced below:

3.1.11

Random Access Point (RAP)

sample in a track that starts at the ISAU of a SAP of type 1 or 2 or 3 as defined in Annex I; informally, a sample, from which when decoding starts, the sample itself and all samples following in composition order can be correctly decoded In the example above, referred to as interpretation 1, a RAP only corresponds to SAP type 1 to 3; thus a gradual decoding refresh (GDR) starting point cannot be considered as a RAP.

In another example, a RAP may correspond to any of SAP types 1 2, 3, or 4, but not other SAP types. For example, a portion of Section 10.1.1.3 of the ISOBMFF is reproduced below:

10.1.1.3 roll_distance is a signed integer that gives the number of samples that must be decoded in order for a sample to be decoded correctly. A positive value indicates the number of samples after the sample that is a group member that must be decoded such that at the last of these recovery is complete, i.e. the last sample is correct. A negative value indicates the number of samples before the sample that is a group member that must be decoded in order for recovery to be complete at the marked sample. The value zero must not be used; the sync sample table documents random access points for which no recovery roll is needed.

In the example above, referred to as interpretation 2, a GDR starting point may be considered as a RAP, which is inconsistent with the definition of RAP in clause 3.1.11 (noted above).

In a third example, a random access point may correspond to a sync sample, which is codec specific. For example, a portion of Section A.7 of the ISOBMFF is reproduced below:

A.7 Random Access

. . .

3) The sample that was located in step 1 may not be a sync sample. The sync sample table indicates which samples are in fact random access points. Using this table, you can locate which is the first sync sample prior to the specified time. The absence of the sync sample table indicates that all samples are synchronization points, and makes this problem easy. Having consulted the sync sample table, you probably wish to seek to whichever resultant sample is closest to, but prior to, the sample found in step 1.

In the example above, referred to as interpretation 3, a RAP is a sync sample and vice versa.

The above-noted interpretations may result in parsing and/or decoding difficulties by decapsulation unit 29 or video decoder 30. For example, decapsulation unit 29 or video decoder 30 may determine whether a particular bitstream conforms to a particular standard and therefore includes information at expected locations based on whether a sample is identified as a RAP. In one example for purposes of illustration, decapsulation unit 29 or video decoder 30 may parse parameter sets from different locations of a bitstream, depending on whether decapsulation unit 29 or video decoder 30 determines that the sample is a RAP sample.

Example sections of the ISO/IEC 14496-15 (referred to herein as the ISOBMFF, which contains the AVC file format, SVC, file format, MVC file format, and the HEVC file format) are included below. In these examples, decapsulation unit 29 or video decoder 30 may interpret RAP differently from one section to another, e.g., as noted above with respect to interpretation 1, interpretation 2, and interpretation 3, which may impact the proper parsing and/or decoding of parameter sets of a bitstream.

For example, a portion of Section 4.8 of the ISOBMFF is reproduced below:

4.8 Sync Sample (IDR)

...

When the sample entry name is 'avc3' or 'avc4', the following applies:
1. If the sample is an IDR access unit, all parameter sets needed for decoding that sample shall be included either in the sample entry or in the sample itself.
2. Otherwise (the sample is not an IDR access unit), all parameter sets needed for decoding the sample shall be included either in the sample entry or in any of the samples since the previous random access point to the sample itself, inclusive.

In the example above, decapsulation unit 29 or video decoder 30 may determine the location of parameter sets of the bitstream based on the definition of a random access point. However, as noted above, decapsulation unit 29 or video decoder 30 may determine the definition of a random access point inconsistently, e.g., as noted above with respect to interpretation 1, interpretation 2, and interpretation 3. Accordingly, decapsulation unit 29 or video decoder 30 may determine that a bitstream does not conform to a particular video coding standard based on one definition of random access point, when in fact the bitstream does conform to the video coding standard based on another definition of random access point. The same issue applies to Sections 6.5.5 and 7.5.3 of the ISOBMFF (both having the same title as Section 4.8) for the SVC file format and the MVC file format, respectively.

As another example, a portion of Section 8.4.3 of the ISOBMFF is reproduced below:

8.4.3 Sync Sample

...

An HEVC sample is considered as a sync sample if the VCL NAL units in the sample indicate that the coded picture contained in the sample is an Instantaneous Decoding Refresh (IDR) picture, a Clean Random Access (CRA) picture, or a Broken Link Access (BLA) picture.

When the sample entry name is 'hev1', the following applies:
If the sample is a random access point, all parameter sets needed for decoding that sample shall be included either in the sample entry or in the sample itself
Otherwise (the sample is not a random access point), all parameter sets needed for decoding the sample shall be included either in the sample entry or in any of the samples since the previous random access point to the sample itself, inclusive.

Again, the different possible random access point interpretations may impact the constraints on placement of parameter sets, and when two different interpretations are used by a composer (e.g., video encoder 20 or encapsulation unit 21) and a parser (e.g., decapsulation unit 29 or video decoder 30), an interoperability issue may occur.

According to aspects of this disclosure, video encoder 20, encapsulation unit 21, decapsulation unit 29, and/or video decoder 30 may apply constraints on the placement of parameter sets for proper decoding and playback of video files. Example syntax and semantics for coding parameter sets, in accordance with various techniques of this disclosure, are set forth below. The syntax and semantics described are relative to e.g., that of AVC, HEVC, SVC, MVC, or the like, as noted.

In the example description, syntax tables and semantics below, additions to the relevant standard are represented using bold and underline and deletions are represented using [[double brackets]]. In general, statements regarding "requirements" should be understood to form part of the text of the standard or standard extension, and not a requirement for purposes of the techniques of this disclosure. In some instances, such "requirements" may include bitstream constraints that may be determined to be applicable and then adhered to by, for example, a video coder based on the determination).

In one example, according to aspects of this disclosure, video encoder 20, encapsulation unit 21, decapsulation unit 29, and/or video decoder 30 may conform to an updated version of Section 4.8 of the AVC file format, where "random access point" is replaced with "sample that is an IDR access unit," as follows:

4.8 Sync Sample (IDR)

A sample is considered as a sync sample if [[ALL of the following conditions are met]] the video data NAL units in the sample indicate that the primary picture contained in the sample is an instantaneous decoding refresh (IDR) picture.

When the sample entry name is 'avc3' or 'avc4', the following applies:
1. If the sample is an IDR access unit, all parameter sets needed for decoding that sample shall be included either in the sample entry or in the sample itself.
2. Otherwise (the sample is not an IDR access unit), all parameter sets needed for decoding the sample shall be included either in the sample entry or in any of the samples since the previous [[random access point]] sample that is an IDR access unit to the sample itself, inclusive.

The same change applies to Sections 6.5.5 and 7.5.3 of the ISOBMFF (both having the same title as Section 4.8) for the SVC file format and the MVC file format, respectively. In this example, video encoder 20, encapsulation unit 21, decapsulation unit 29, and/or video decoder 30, or other devices, may be configured to determine that the sample is a sync sample if the video data NAL units in the sample indicate that the primary picture contained in the sample is an DR picture. Video encoder 20, encapsulation unit 21, decapsulation unit 29, and/or video decoder 30, or other devices, may be further configured such that, if the sample is an IDR access unit, all parameter sets needed for decoding the sample are included, e.g., encoded, stored or otherwise placed, either in the sample entry for the sample or in the sample itself. Hence, when the sample is an IDR access unit, with all parameter sets needed for decoding the sample included in this manner, video decoder 30 may determine parameter set data for video data of the sync sample only from the sample entry for the sample or the sample itself. Determining parameter set data may refer, for example, to parsing, decoding, retrieving or otherwise obtaining parameter set data.

In this example, all of the parameter sets needed for decoding the sample are included in the sample entry of the sample or the sample itself. Therefore, the parameter set data for decoding the video data of the sample is included only in the sample entry of the sample or the sample itself. Likewise, to decode the video data of the sample, all of the parameter set data needed to decode the video data of the sample is determined from the sample entry of the sample or the sample itself. Therefore, for decoding, parameter set data for the video data is determined only from the sample entry of the sample or the sample itself.

In addition, in this example, video encoder 20, encapsulation unit 21, decapsulation unit 29, and/or video decoder 30, or other devices, may be configured such that, if the sample is not an IDR access unit, all parameter sets needed for decoding the sample are included, e.g., encoded, stored or otherwise placed, either in the sample entry for the sample or in any of the samples since the previous sample that is an DR access unit to the sample that is not an IDR access unit itself, inclusive. That is, if the sample is not an DR access unit, all parameter sets needed for decoding the sample are included either in the sample entry for the sample that is not an IDR access unit, the sample that is not an IDR access unit itself, the previous sample that is an IDR access unit, or the samples after the previous sample that is an IDR access unit and before the sample itself, i.e., before the sample that is not an IDR access unit. With all parameter sets needed for decoding the sample that is not an IDR access unit included in this manner, video decoder 30 may determine parameter set data for video data of the sample only from the sample entry for the sample, the sample itself, a previous sample that is an IDR access unit, or from samples occurring between the sample that is not an IDR access unit and the previous sample that is an IDR access unit.

In this example, all of the parameter sets needed for decoding the sample that is not an IDR access unit are included in the sample entry for the sample, the sample itself, a previous sample that is an IDR access unit, or in samples occurring between the sample that is not an IDR access unit and the previous sample that is an IDR access unit. Therefore, the parameter set data for decoding the video data of the sample is included only in the sample entry for the sample, the sample itself, a previous sample that is an IDR access unit, or in samples occurring between the sample that is not an IDR access unit and the previous sample that is an IDR access unit. Likewise, to decode the video data of the sample, all of the parameter set data needed to decode the video data of the sample is determined from the sample entry for the sample, the sample itself, a previous sample that is an IDR access unit, or in samples occurring between the sample that is not an IDR access unit and the previous sample that is an IDR access unit. Therefore, for decoding the video data of the sample, parameter set data for the video data is determined only from the sample entry for the sample, the sample itself, a previous sample that is an IDR access unit, or in samples occurring between the sample that is not an IDR access unit and the previous sample that is an IDR access unit.

In some examples, video encoder 20, encapsulation unit 21, decapsulation unit 29, and/or video decoder 30, or other devices, may be further configured such that, if the sample is an IDR access unit and the sample entry name is a particular name, such as 'avc3' or 'avc4', all parameter sets needed for decoding that sync sample are included e.g., encoded, stored or otherwise placed, either in the sample entry for the sample or in the sample itself. Hence, with all parameter sets needed for decoding the sample included in this manner, if the sample is an IDR access unit and the sample entry name is a particular name, such as 'avc3' or 'avc4', video decoder 30 may determine parameter set data for video data of the sample only in the sample entry for the sample or the sample itself. Hence, the parameter set data may be determined in this manner based on determining that the sample is an IDR access unit and further based on an entry name of the sample, such as the sample entry name being a particular name or one of a set of particular names, e.g., 'avc3' or 'avc4'. If the sample entry name is not a particular name, the placement or determination of the parameter set data may be handled differently.

In some examples, video encoder 20, encapsulation unit 21, decapsulation unit 29, and/or video decoder 30, or other devices, may be further configured such that, if the sample is not an IDR access unit and the sample entry name is a particular name, such as 'avc3' or 'avc4', all parameter sets needed for decoding that sync sample are included, e.g., encoded, stored or otherwise placed, either in the sample entry for the sample that is not an IDR access unit, the sample that is not an IDR access unit itself, the previous sample that is an IDR access unit, or the samples after the previous sample that is an IDR access unit and before the sample itself, i.e., before the sample that is not an IDR access unit. Hence, with all parameter sets needed for decoding the sample included in this manner, if the sample is not an IDR access unit and the sample entry name is a particular name, such as 'avc3' or 'avc4', video decoder 30 may determine parameter set data for video data of the sample only in the sample entry for the sample that is not an IDR access unit, the sample that is not an IDR access unit itself, the previous sample that is an IDR access unit, or the samples after the previous sample that is an IDR access unit and before the sample itself, i.e., before the sample that is not an IDR access unit. Hence, the parameter set data may be decoded in this manner based on determining that the sample is not an IDR access unit and further based on an entry name of the sample, such as the sample entry name being a particular name or one of a set of particular names, e.g., 'avc3' or 'avc4'. If the sample entry name is not a particular name, the placement or determination of the parameter set data may be handled differently.

In another example, according to aspects of this disclosure, video encoder 20, encapsulation unit 21, decapsulation unit 29, and/or video decoder 30, as examples, may conform to an updated version of Section 4.8 of the AVC file format, as follows:

4.8 Sync Sample (IDR)

A sample is considered as a sync sample if [[ALL of the following conditions are met]] the video data NAL units in the sample indicate that the primary picture contained in the sample is an instantaneous decoding refresh (IDR) picture.

When the sample entry name is 'avc3' or 'avc4', the following applies:
1. If the sample is [[an IDR access unit]] a sync sample, all parameter sets needed for decoding that sample shall be included either in the sample entry or in the sample itself
2. Otherwise (the sample is not [[an IDR access unit]] a sync sample), all parameter sets needed for decoding the sample shall be included either in the sample entry or in any of the samples since the previous [[random access point]] sync sample to the sample itself, inclusive.

Again, the same change applies to Sections 6.5.5 and 7.5.3 of the ISOBMFF (both having the same title as Section 4.8) for the SVC file format and the MVC file format, respectively. In this example, video encoder 20, encapsulation unit 21, decapsulation unit 29, and/or video decoder 30, or other devices, may be configured to determine that the sample is a sync sample if the video data NAL units in the sample indicate that that primary picture contained in the sample is an IDR picture. Video encoder 20, encapsulation unit 21, decapsulation unit 29, and/or video decoder 30, or other devices, may be further configured such that, if the sample is a sync sample, all parameter sets needed for decoding that sync sample are included (e.g., by video encoder 20, encapsulation unit 21, decapsulation unit 29, and/or video decoder 30, or another device) either in the sample entry for the sync sample or in the sync sample itself. Hence, with all parameter sets needed for decoding the sync sample included in this manner, video decoder 30 may determine parameter set data for video data of the sync sample only in the sample entry for the sample or the sample itself. Determining parameter set data may refer, for example, to parsing, decoding, retrieving or otherwise obtaining parameter set data.

In this example, all of the parameter sets needed for decoding the sync sample are included in the sample entry for the sync sample or the sync sample itself. Therefore, the parameter set data for decoding the video data of the sync sample is included only in the sample entry of the sync sample or the sync sample itself. Likewise, to decode the video data of the sync sample, all of the parameter set data needed to decode the video data of the sync sample is determined from the sample entry of the sync sample or the sync sample itself. Therefore, for decoding, parameter set data for the video data is determined by decoder 30 only from the sample entry of the sync sample or the sync sample itself.

In addition, in this example, video encoder 20, encapsulation unit 21, decapsulation unit 29, and/or video decoder 30, or other devices, may be configured such that, if the sample is not a sync sample, all parameter sets needed for decoding the sample are included either in the sample entry for the sample or in any of the samples since the previous sync sample to the sample itself, inclusive. That is, if the sample is not a sync sample, all parameter sets needed for decoding the sample that is not a sync sample are included e.g., encoded, stored or otherwise placed, either in the sample entry for the sample that is not a sync sample, the sample that is not a sync sample itself, the previous sync sample, or one or more samples after the previous sync sample and before the sample itself, i.e., before the sample that is not a sync sample. The sample that is not a sync sample also may be referred to as a non-sync sample. With all parameter sets needed for decoding the non-sync sample included in this manner, video decoder 30 may determine parameter set data for video data of the non-sync sample only from the sample entry for the sample, the sample itself, a previous sync sample, or from samples occurring between the non-sync sample and the previous sync sample.

In this example, all of the parameter sets needed for decoding the non-sync sample are included in the sample entry for the non-sync sample, the non-sync sample itself, a previous sample that is a sync sample, or in samples occurring between the non-sync sample and the previous sync sample. Therefore, the parameter set data for decoding the video data of the non-sync sample is included only in the sample entry for the non-sync sample, the non-sync sample itself, a previous sample that is a sync sample, or in samples occurring between the non-sync sample and the previous sync sample. Likewise, to decode the video data of the non-sync sample, all of the parameter set data needed to decode the video data of the non-sync sample is determined from the sample entry for the non-sync sample, the non-sync sample itself, a previous sync sample, or in samples occurring between the non-sync sample and the previous sync sample. Therefore, to decode the video data of the non-sync sample, parameter set data for the video data is determined only from the sample entry for the non-sync sample, the non-sync sample itself, a previous sync sample, or in samples occurring between the non-sync sample and the previous sync sample.

In some examples, video encoder 20, encapsulation unit 21, decapsulation unit 29, and/or video decoder 30, or other devices, may be further configured such that, if the sample is a sync sample and the sample entry name is a particular name, such as 'avc3' or 'avc4', all parameter sets needed for decoding that sync sample are included, e.g., encoded, stored or otherwise placed, either in the sample entry for the sync sample or in the sync sample itself. Hence, with all parameter sets needed for decoding the sample included in this manner, if the sample is a sync sample and the sample entry name is a particular name, such as 'avc3' or 'avc4', video decoder 30 may determine parameter set data for video data of the sync sample only in the sample entry for the sync sample or the sync sample itself. Hence, the parameter set data may be decoded in this manner based on determining that the sample is a sync sample and further based on an entry name of the sample, such as the sample entry name being a particular name or one of a set of particular names, e.g., 'avc3' or 'avc4'. If the sample entry name is not a particular name, the placement or determination of the parameter set data may be handled differently.

In some examples, video encoder 20, encapsulation unit 21, decapsulation unit 29, and/or video decoder 30, or other devices, may be further configured such that, if the sample is not a sync sample and the sample entry name is 'avc3' or 'avc4', all parameter sets needed for decoding the sample are included, e.g., encoded, stored or otherwise placed, either in the sample entry for the sample that is not a sync sample, the sample that is not a sync sample itself, the previous sync sample, or the samples after the previous sync sample and before the sample itself, i.e., before the sample that is not a sync sample. Hence, with all parameter sets needed for decoding the sample included in this manner, if the sample is not a sync sample and the sample entry name is a particular name, such as 'avc3' or 'avc4', video decoder 30 may determine parameter set data for video data of the sample only in the sample entry for the sample that is not a sync sample, the sample that is not a sync sample itself, the previous sync sample, or one or more samples after the previous sync sample and before the sample itself, i.e., before the sample that is not a sync sample. In this manner, the parameter set data may be determined in this manner based on determining that the sample is not a sync sample and further based on an entry name of the sample, such as the sample entry name being a particular name or one of a set of particular names, e.g., 'avc3' or 'avc4'. If the sample entry name is not a particular name, the placement or determination of the parameter set data may be handled differently.

With respect to HEVC, in another example in accordance with the techniques of this disclosure, video encoder 20, encapsulation unit 21, decapsulation unit 29, and/or video decoder 30 may conform to an updated version of Section 8.4.3 of the HEVC file format, where "random access point" is replaced with "sync sample," as follows:

8.4.3 Sync Sample

. . .

An HEVC sample is considered as a sync sample if the VCL NAL units in the sample indicate that the coded picture contained in the sample is an Instantaneous Decoding Refresh (IDR) picture, a Clean Random Access (CRA) picture, or a Broken Link Access (BLA) picture.

When the sample entry name is 'hev1', the following applies:
If the sample is a [[random access point]] sync sample, all parameter sets needed for decoding that sample shall be included either in the sample entry or in the sample itself.
Otherwise (the sample is not a [[random access point]] sync sample), all parameter sets needed for decoding the sample shall be included either in the sample entry or in any of the samples since the previous [[random access point]] sync sample to the sample itself, inclusive.

In this example, video encoder 20, encapsulation unit 21, decapsulation unit 29, and/or video decoder 30, or other devices, may be configured to determine that the sample is a sync sample if the VCL NAL units in the sample indicate that the coded picture contained in the sample is an Instantaneous Decoding Refresh (IDR) picture, a Clean Random Access (CRA) picture, or a Broken Link Access (BLA) picture. Video encoder 20, encapsulation unit 21, decapsulation unit 29, and/or video decoder 30, or other devices, may be further configured such that, if the sample is a sync sample, all parameter sets needed for decoding video data of the sync sample are included either in the sample entry for the sync sample or in the sync sample itself. Hence, with all parameter sets needed for decoding the sync sample included in this manner, video decoder 30 may determine, for the sync sample, parameter set data for video data of the sample only from the sample entry for the sample or from the sample itself. Determining parameter set data may refer, for example, to parsing, decoding, retrieving or otherwise obtaining parameter set data.

In this example, all of the parameter sets needed for decoding the sync sample are included in the sample entry for the sync sample or the sync sample itself. Therefore, the parameter set data for decoding the video data of the sync sample is included only in the sample entry of the sync sample or the sync sample itself. Likewise, to decode the video data of the sync sample, all of the parameter set data needed to decode the video data of the sync sample is determined from the sample entry of the sync sample or the sync sample itself. Therefore, for decoding, parameter set data for the video data is determined, e.g., by video decoder 30, only from the sample entry of the sync sample or the sync sample itself.

In this example, video encoder 20, encapsulation unit 21, decapsulation unit 29, and/or video decoder 30, or other devices, may be configured such that, if the sample is not a sync sample, all parameter sets needed for decoding the sample are included either in the sample entry for the sample or in any of the samples since the previous sync sample to the sample itself, inclusive. That is, if the sample is not a sync sample, all parameter sets needed for decoding the sample are included either in the sample entry for the sample that is not a sync sample, the sample that is not a sync sample itself, the previous sync sample, or the samples after the previous sync sample and before the sample itself, i.e., before the sample that is not a sync sample. The sample that is not a sync sample also may be referred to as a non-sync sample. Hence, with all parameter sets needed for decoding the non-sync sample included in this manner, video decoder 30 may determine parameter set data for decoding video data of the non-sync sample only from the sample entry for the non-sync sample, the non-sync sample itself, the previous sync sample, or from one or more samples occurring between the non-sync sample and the previous sync sample.

In this example, all of the parameter sets needed for decoding the non-sync sample are included in the sample entry for the non-sync sample, the non-sync sample itself, a previous sample that is a sync sample, or in samples occurring between the non-sync sample and the previous sync sample. Therefore, the parameter set data for decoding the video data of the non-sync sample is included only in the sample entry for the non-sync sample, the non-sync sample itself, a previous sample that is a sync sample, or in samples occurring between the non-sync sample and the previous sync sample. Likewise, to decode the video data of the non-sync sample, all of the parameter set data needed to decode the video data of the non-sync sample is determined from the sample entry for the non-sync sample, the non-sync sample itself, a previous sync sample, or from samples occurring between the non-sync sample and the previous sync sample. Therefore, to decode the video data of the non-sync sample, parameter set data for the video data is determined, e.g., by video decoder 30, only from the sample entry for the non-sync sample, the non-sync sample itself, a previous sync sample, or from one or more samples occurring between the non-sync sample and the previous sync sample.

In some examples, video encoder 20, encapsulation unit 21, decapsulation unit 29, and/or video decoder 30, or other devices, may be further configured such that, if the sample is a sync sample and the sample entry name is a particular name, such as 'hev1', all parameter sets needed for decoding that sync sample are included, e.g., encoded, stored or otherwise placed, either in the sample entry for the sample or in the sample itself. Hence, with all parameter sets needed for decoding the sample included in this manner, if the sample is a sync sample and the sample entry name is a particular name, such as 'hev1', video decoder 30 may determine parameter set data for decoding video data of the sample only in the sample entry for the sync sample or the sync sample itself. Hence, the parameter set data may be determined in this manner based on determining that the sample is a sync sample and further based on an entry name of the sample, such as the sample entry name being a particular name or one of a set of particular names, e.g., 'hev1'. If the sample entry name is not a particular name, the placement of parameter set data may be handled differently.

In some examples, video encoder 20, encapsulation unit 21, decapsulation unit 29, and/or video decoder 30, or other devices, may be further configured such that, if the sample is not a sync sample and the sample entry name is 'hev1', all parameter sets needed for decoding that sync sample are included, e.g., encoded, stored or otherwise placed, either in the sample entry for the sample that is not a sync sample, the sample that is not a sync sample itself, the previous sync sample, or one or more samples after the previous sync sample and before the sample itself, i.e., before the sample that is not a sync sample. Hence, with all parameter sets needed for decoding the sample included in this manner, if the sample is not a sync sample (i.e., it is a non-sync sample) and the sample entry name is a particular name, such as 'hev1', video decoder 30 may determine parameter set data for decoding video data of the non-sync sample only in the sample entry for the non-sync sample, the non-sync sample itself, the previous sync sample, or one or more samples after the previous sync sample and before the non-sync sample itself, i.e., before the sample that is not a sync sample. Hence, the parameter set data may be decoded in this manner based on determining that the sample is not a sync sample and further based on an entry name of the sample, such as the sample entry name being a particular name or one of a set of particular names, e.g., 'hev1'. If the sample entry name is not a particular name, the determination of parameter set data may be handled differently.

Other aspects of this disclosure relate to determining whether a sample is a sync sample. For example, according to aspects of this disclosure, the definition of a sync sample in the layered HEVC file format for a layered-HEVC bitstream may be updated to be aligned and backward compatible to that in HEVC file format. In general, a generic name, layered-HEVC (L-HEVC), may be used for all HEVC extensions that use the same layered design. An L-HEVC bitstream may be a collection of layers where each layer helps to scale the visual presentation in quality, resolution, frame rate, views, depth, and such. A collection of related layers are grouped together as layer sets. A layer in any layer set is uniquely identified by their layer identifier (L-id). A layer may be a member of one or more layer sets. NAL units belonging to a layer can be further partitioned based on their temporal identifier (T-id). Each such partition is called a sub-layer.

In the HEVC file format, an HEVC sample may be considered a sync sample if the VCL NAL units in the sample indicate that the coded picture contained in the sample is an IDR picture, a CRA picture, or a BLA picture. However, in the draft L-HEVC file format, an L-HEVC sample may be considered a sync sample if each coded pictures in the access unit is an intra-random access point (TRAP) picture without Random Access Skipped Leading (RASL) picture. For example, SHVC and MV-HEVC both use the same layered design.

In the example above, the definition of sync sample in the draft layered HEVC file format may not be aligned with that in the HEVC file format, with the mismatch being whether the presence of RASL pictures for an TRAP picture would disallow the sample from being a sync sample. This mismatch may create an issue in which the definition of sync sample in the L-HEVC file format is not backward compatible to the HEVC file format when an HEVC compatible sample entry, i.e., one of 'hvc1', 'hev1', 'hvc2', and 'hev2,' is in use.

According to aspects of this disclosure, video encoder 20, encapsulation unit 21, decapsulation unit 29, and/or video decoder 30 may be configured to conform to an updated definition of sync sample in the L-HEVC file format to be aligned and backward compatible to that in HEVC file format. For example, depending on the sample entry name, a sync sample for the L-HEVC file format is defined as follows:

When the sample entry name is 'hvc1', 'hev1', 'hvc2', or 'hev2', an L-HEVC sample is considered as a sync sample if the base layer picture in the access unit is an IRAP picture as defined in ISO/IEC 23008-2.

When the sample entry name is 'lhv1' or 'lhe1', an L-HEVC sample is considered as a sync sample if each coded picture in the access unit is an IRAP picture as defined in ISO/IEC 23008-2.

Alternatively, regardless of the same entry name, video encoder 20, encapsulation unit 21, decapsulation unit 29, and/or video decoder 30 may be configured to determine that an L-HEVC sample is a sync sample if the base layer picture in the access unit is an TRAP picture as defined in ISO/IEC 23008-2.

Alternatively, regardless of the same entry name, video encoder 20, encapsulation unit 21, decapsulation unit 29, and/or video decoder 30 may be configured to determine that an L-HEVC sample is a sync sample if each coded picture in the access unit is an TRAP picture as defined in ISO/IEC 23008-2. Sync samples are documented by the sync sample table, and may be additionally documented by the stream access point 'sap.' sample group.

Figure 2:
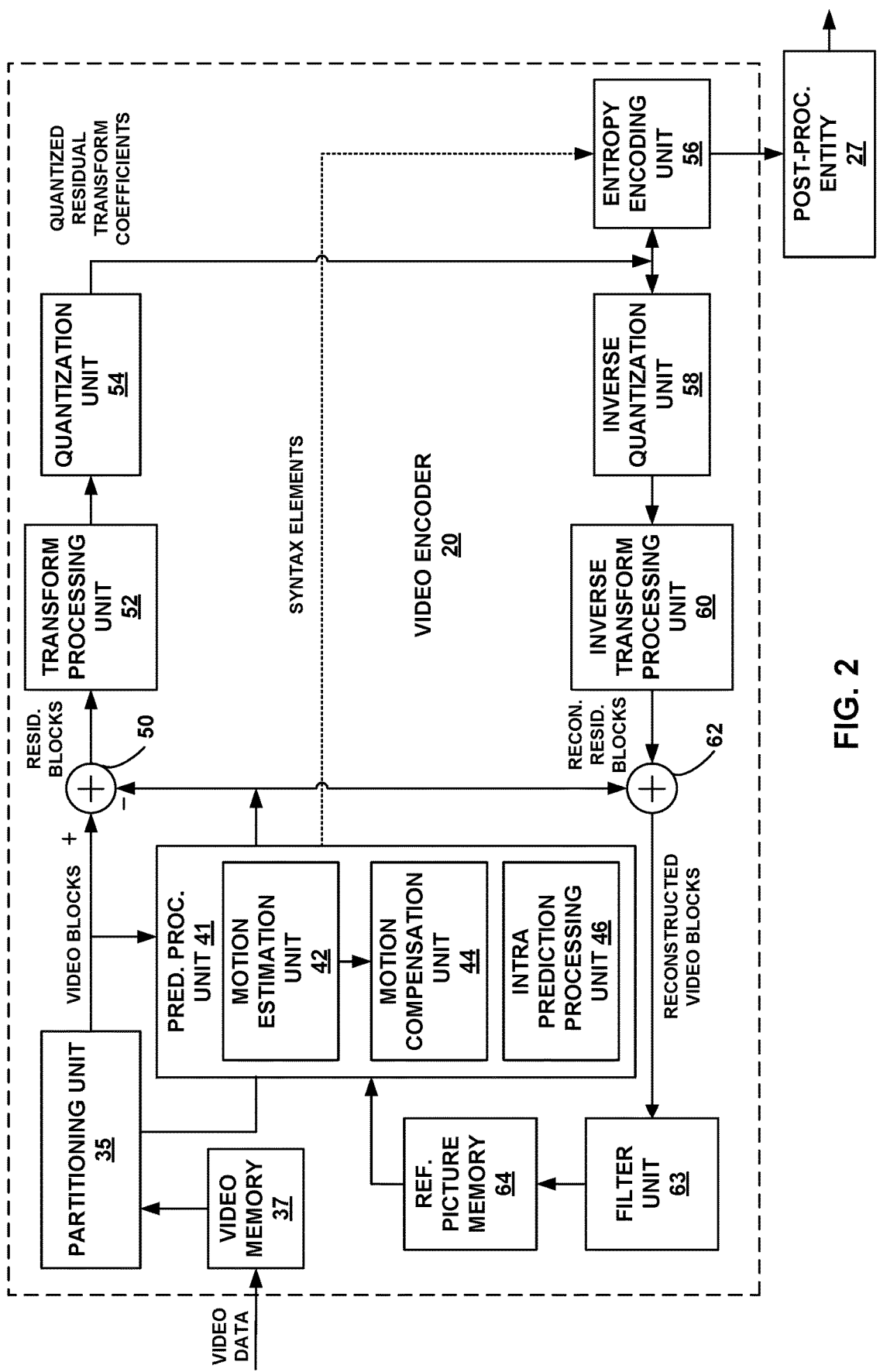
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may include memory for storing video data and one or more processors configured to perform video coding operations, such as operations to encode the video data, and operations to include parameter set data for decoding samples in particular locations as described in this disclosure. Video encoder 20 may be configured to output video to post processing entity 27, which is another example device that may implement the techniques for encoding video data as described in this disclosure. For example, post processing entity 27 may perform techniques for including parameter set data for decoding samples in particular locations, and/or determining parameter set data for decoding samples from particular locations, as described in this disclosure. Post processing entity 27 is intended to represent an example of a video entity, such as a media aware network element (MANE), a splicing/editing device or another intermediate device that may process encoded video data from video encoder 20. In some instances, post processing entity 27 may be an example of a network entity. In some video encoding systems, post-processing entity 27 and video encoder 20 may be parts of separate devices, while in other instances, the functionality described with respect to post-processing entity 27 may be performed by the same device that comprises video encoder 20.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, video memory 37, prediction unit 41, filter unit 63, reference picture memory 64, summer 50, transform processing unit 52, quantization unit 54, and entropy encoding unit 56. Prediction unit 41 includes motion estimation unit 42, motion compensation unit 44, and intra prediction processing unit 46. Video memory 37 and reference picture memory 64 may be portions of the same memory device or separate memory devices. The memory device may be any form of computer-readable media or data storage media described in this disclosure, such as RAM, ROM, Flash memory or the like, or combinations thereof. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 2 as being an in-loop filter, in other configurations, filter unit 63 may be implemented as a post-loop filter.

As shown in FIG. 2, video encoder 20 receives video data to be encoded, e.g., in video memory 37, and partitioning unit 35 partitions the video data in video memory 37 into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes, e.g., by calculating rate-distortion values using a rate-distortion analysis for the various tested intra-prediction modes and selecting the intra-prediction mode having the best rate-distortion characteristics among the tested modes.

In any case, after selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

In this manner, video encoder 20 of FIG. 2 represents an example of a video encoder configured to implement one or more of the techniques set forth herein. In one example, entropy encoding unit 56 may perform the techniques described herein with respect to parameter sets and sync samples. Furthermore, post processing entity 27 of FIG. 2 is another example device that may implement the techniques described in this disclosure with respect to parameter sets and sync samples.

Figure 3:
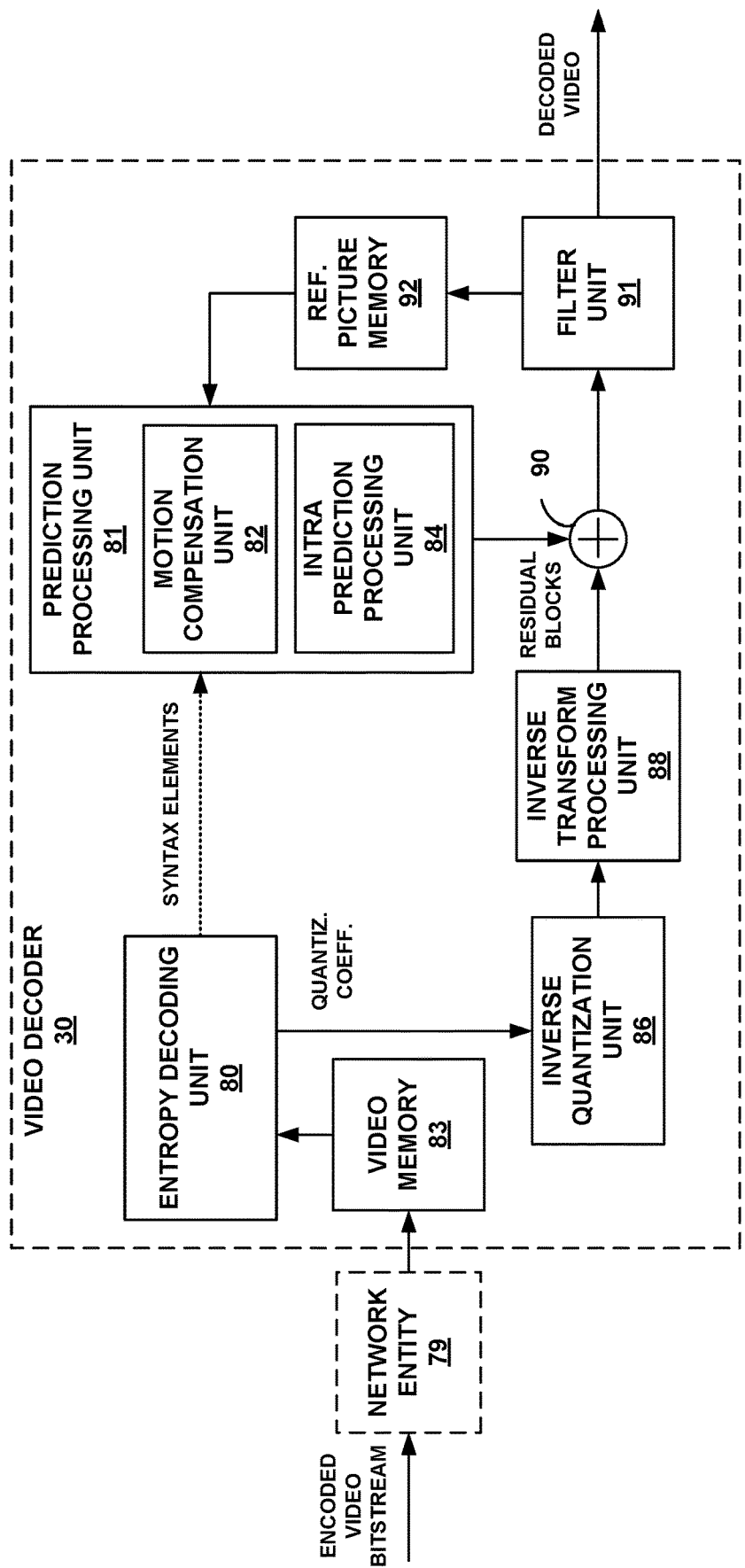
FIG. 3 is a block diagram illustrating an example video decoder that may implement the techniques described in this disclosure.

FIG. 3 is a block diagram illustrating an example video decoder 30 that may implement the techniques described in this disclosure. Video decoder 30 may include memory for storing video data and one or more processors configured to perform video coding operations, such as operations to decode the video data, and operations to determine parameter set data for decoding samples from particular locations as described in this disclosure. In the example of FIG. 3, video decoder 30 includes an entropy decoding unit 80, video memory 83, prediction processing unit 81, inverse quantization unit 86, inverse transformation unit 88, summer 90, filter unit 91, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. For example, video memory 83 may receive the encoded video bitstream. In some examples, video memory 83 may be a coded picture buffer. Video decoder 30 may receive the encoded video bitstream, e.g., via video memory 83, from network entity 79 (which may, in some examples, correspond to router 36 of FIG. 1). Network entity 79 may, for example, be a server, a MANE, a video editor/splicer, or other such device configured to implement one or more of the techniques for decoding video data described above. Network entity 79 may or may not include a video encoder, such as video encoder 20. Some of the techniques described in this disclosure may be implemented by network entity 79 prior to network entity 79 transmitting the encoded video bitstream to video decoder 30. In some examples, network entity 79 may perform techniques for including parameter set data for decoding samples in particular locations, and/or determining parameter set data for decoding samples from particular locations, as described in this disclosure. In some video decoding systems, network entity 79 and video decoder 30 may be parts of separate devices, while in other instances, the functionality described with respect to network entity 79 may be performed by the same device that comprises video decoder 30.

Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation.

If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 3 as being an in-loop filter, in other configurations, filter unit 91 may be implemented as a post-loop filter. The decoded video blocks in a given frame or picture are then stored in reference picture memory 92, which stores reference pictures used for subsequent motion compensation. Reference picture memory 92 also stores decoded video for later presentation on a display device, such as display device 31 of FIG. 1. Reference picture memory 92 may be referred to as a decoded picture buffer. Video memory 83 and reference picture memory 92 may be portions of the same memory device or separate memory devices. The memory device may be any form of computer-readable media or data storage media described in this disclosure, such as RAM, ROM, Flash memory or the like, or combinations thereof.

In this manner, video decoder 30 of FIG. 3 represents an example of a video encoder configured to implement one or more of the techniques set forth herein. In one example, entropy decoding unit 80 may perform the techniques described herein with respect to parameter sets and sync samples. Furthermore, network entity 79 of FIG. 3 (which may be a media aware network element) is another example device that may implement the techniques described in this disclosure with respect to parameter sets and sync samples.

Figure 4:
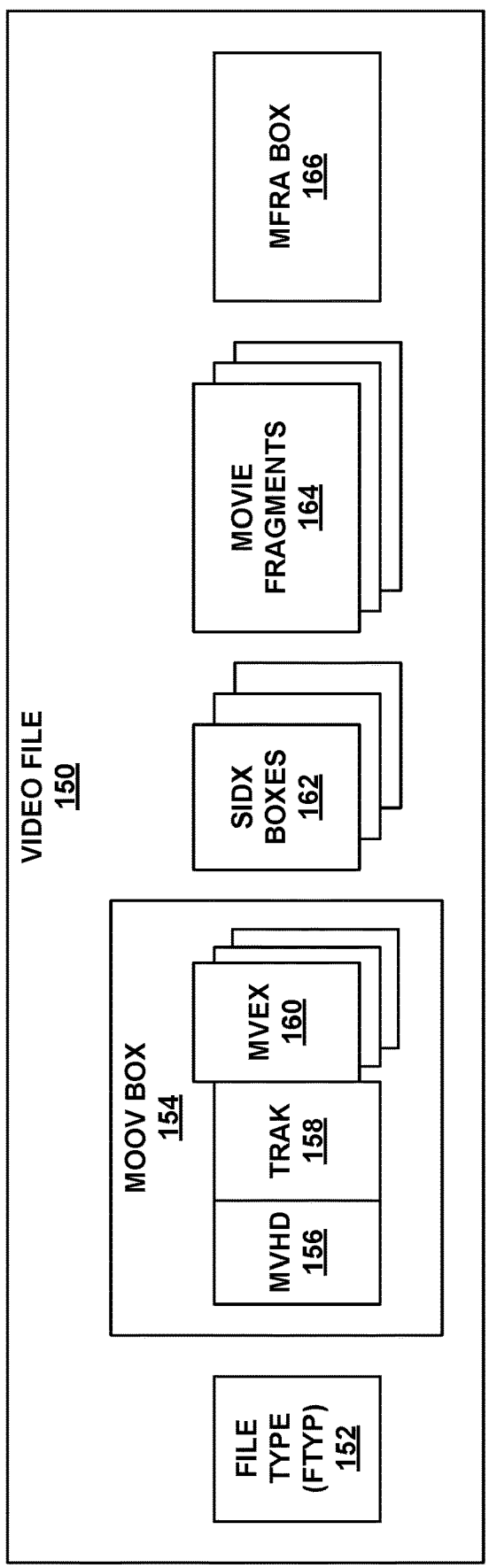
FIG. 4 is a block diagram illustrating elements of an example video file.

FIG. 4 is a block diagram illustrating elements of an example video file 150. Video file 150 may be said to encapsulate a segment. As described herein, video files in accordance with the ISO base media file format (ISOBMFF) and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 21 (FIG. 1) includes a parameter set track in a video file, such as video file 150.

For example, a sync sample in a parameter set track may indicate that all parameter sets needed from that decoding time forward in the video elementary stream are in that or succeeding parameter stream samples. There may also be a parameter set sample at each point a parameter set is updated. Each parameter set may contain the sequence and picture parameter sets needed to decode the relevant section of the video elementary stream. Encapsulation unit 21 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 21 may store a sequence data set in a video sample that does not include actual coded video data. A video sample may generally correspond to an access unit, which is a representation of one or more coded pictures at a specific time instance. In the context of AVC, the coded picture includes one or more VCL NAL units which contains the information to construct all the pixels of the access unit and other associated non-VCL NAL units, such as SEI messages. Accordingly, encapsulation unit 21 may include a sequence data set, which may include sequence level SEI messages, in one of movie fragments 164. Encapsulation unit 21 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a SAP, a type for the SAP (e.g., whether the SAP is an IDR picture, a CRA picture, a BLA picture, or the like), a position of the SAP (in terms of playback time and/or byte offset) in the sub-segment, and the like.

Movie fragments 164 may include one or more coded video pictures. In some examples, movie fragments 164 may include one or more GOPs, each of which may include a number of coded video pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as destination device 14, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more SAPs, such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

According to the techniques of this disclosure, a video decoder (such as decapsulation unit 29 and/or video decoder 30 (FIG. 1) may be configured to determine parameter set data based on samples or sample entries of video data. For example, decapsulation unit 29 and/or video decoder 30 may be configured to determine whether a sample of video data included in movie fragments 164 is a sync sample. In some examples, decapsulation unit 29 and/or video decoder 30 may determine whether such samples are sync samples according to the ISOBMFF, e.g., based on conditions set forth in Section 4.8 (AVC), Section 6.5.5 (SVC), Section 7.5.3 (MVC) and Section 8.4.3 (HEVC) of the ISOBMFF. Decapsulation unit 29 and/or video decoder 30 may evaluate such conditions based on the samples themselves or based on descriptions associated with MRFA box 166.

Decapsulation unit 29 and/or video decoder 30 may determine parameter set data, for decoding video data of a sample, differently for samples that are sync samples than for samples that are not sync samples. For example, decapsulation unit 29 and/or video decoder 30 may be configured to determine parameter set data for sync samples only from a sample entry associated with the sample or from the sample itself. On the other hand, decapsulation unit 29 and/or video decoder 30 may be configured to decode parameter set data for non-sync samples only from a sample entry associated with the non-sync sample, from the non-sync sample itself, from a sync sample prior to the non-sync sample in decoding order, or from samples occurring prior to the non-sync sample in decoding order but after the previous sync sample in decoding order.

Figure 5:
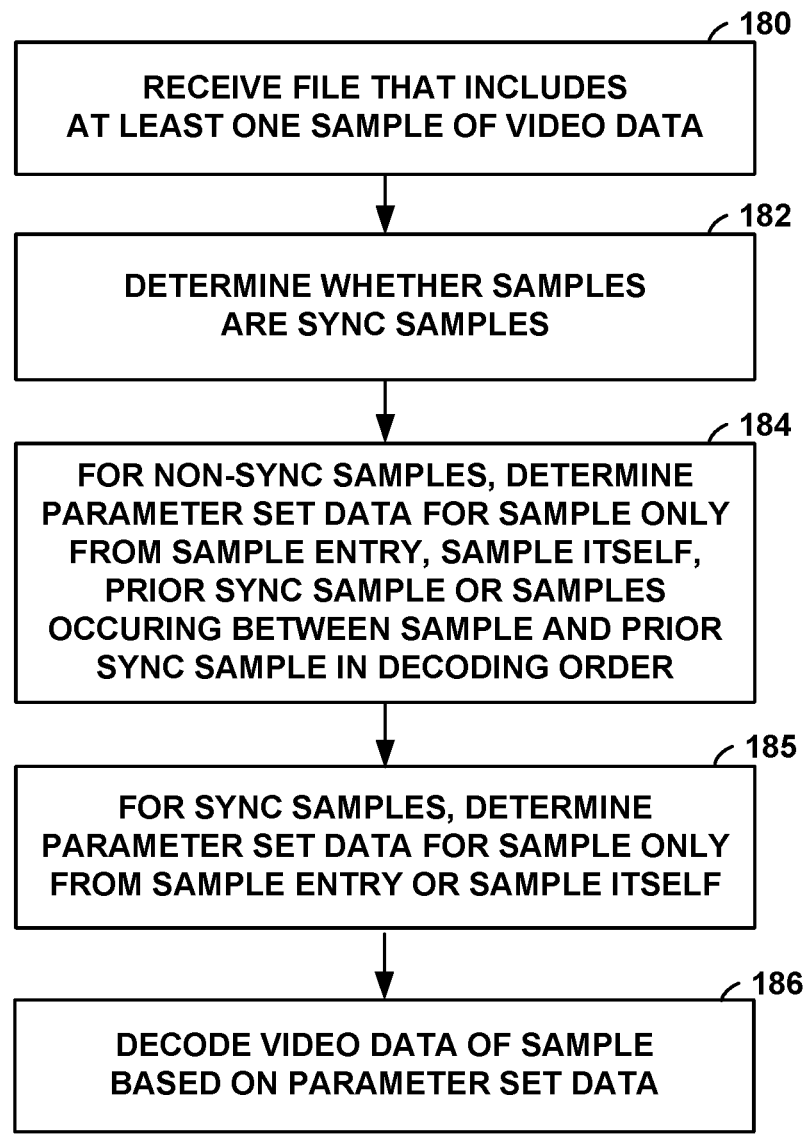
FIG. 5 is a flow diagram illustrating a process for decoding parameter set data from a video bitstream.

FIG. 5 is a flow diagram illustrating a process for decoding parameter set data from a video bitstream. While described with respect to video decoder 30 (FIGS. 1 and 3) for purposes of illustration, it should be understood that the process of FIG. 5, or portions thereof, may also be executed by decapsulation unit 29 (FIG. 1), network entity 79 (FIG. 3), or other processing units configured to parse and/or decode video data. For example, decapsulation unit 29 or network entity 79 may perform techniques for including parameter set data for decoding samples in particular locations, or determining parameter set data for decoding samples from particular locations, as described in this disclosure and illustrated in FIG. 5.

In the example of FIG. 5, video decoder 30 may receive a file of video data that includes one or more samples of video data (180). For example, the file may conform to the ISOBMFF, as described herein. In addition, the one or more samples each may correspond to an access unit of video data.

Video decoder 30 may determine whether any samples of the one or more samples are sync samples (182). For example, prior to decoding the video data of the samples, video decoder 30 may analyze the bitstream that contains the samples to ensure conformance to a particular video coding standard. Video decoder 30 may determine whether any of the samples may be processed as sync samples, as defined by the particular coding standard. In an example for purposes of illustration, video decoder 30 may determine whether any of the samples are sync samples based on the constraints set forth in Section 4.8 (AVC), Section 6.5.5 (SVC), Section 7.5.3 (MVC) and Section 8.4.3 (HEVC) of the ISOBMFF.

Based on determining that a sample is not a sync sample, i.e., that the sample is a non-sync sample, video decoder 30 or another device may determine (e.g., by parsing, decoding, retrieving or otherwise obtaining) parameter set data for the non-sync sample only from the sample entry corresponding to the non-sync sample, the non-sync sample itself, a previous sample that occurs before the non-sync sample in decoding order and is a sync sample, or from one or more samples occurring between the non-sync sample and the previous sync sample in decoding order (184). For example, video decoder 30 may be constrained to certain locations of the bitstream from which parameter set data for the sample may be decoded. For a given bitstream having samples arranged in decoding order, video decoder 30 may not decode parameter set data of video data for a non-sync sample from any location other than the sample entry corresponding to the non-sync sample, the non-sync sample itself, a previous sample decoded as a sync sample in decoding order before the non-sync sample, or from samples that occur prior to the non-sync sample in decoding order but that follow the previous sample decoded as a sync sample in decoding order. All parameter set data needed for decoding the video data of the non-sync sample is included in the sample entry corresponding to the non-sync sample, the non-sync sample itself, a previous sample decoded as a sync sample in decoding order before the non-sync sample, or in samples that occur prior to the non-sync sample in decoding order but that follow the previous sample decoded as a sync sample in decoding order.

In other words, for a current sample that is not a sync sample, video decoder 30 may determine parameter set data that is included only in the sample entry for the non-sync sample or in any of the samples since the previous sync sample to the current non-sync sample, inclusive, i.e., including the previous sync sample, the samples after the previous sync sample but before the current non-sync sample, and including the current non-sync sample. Video decoder 30 may be configured to determine the parameter set data for a non-sync sample from only these constrained locations because, if the sample is not a sync sample, all parameter sets needed for decoding the sample may be included either in the sample entry for the sample or in any of the samples since the previous sync sample to the sample itself, inclusive. For example, video encoder 20, encapsulation unit 21, decapsulation unit 29, and/or video decoder 30, or other devices, may be configured such that, if the sample is not a sync sample, all parameter sets needed for decoding the sample are included either in the sample entry for the sample or in any of the samples since the previous sync sample to the sample itself, inclusive.

Based on determining that a sample is a sync sample, video decoder 30 may determine parameter set data for the sample only from the sample entry for the sync sample or the sync sample itself (185). All parameter set data needed for decoding the video data of the sync sample is included in the sample entry corresponding to the sync sample or the sync sample itself. Hence, for a sync sample, video decoder 30 may determine parameter set data for the sync sample only in the sample entry or the sample itself, and not in other samples or locations. Video decoder 30 may be configured to determine (e.g., by parsing, decoding, retrieving or otherwise obtaining) the parameter set data for a non-sync sample from only these constrained locations because, if the sample is a sync sample, all parameter sets needed for decoding the sync sample are included either in the sample entry for the sample or in the sample itself. For example, video encoder 20, encapsulation unit 21, decapsulation unit 29, and/or video decoder 30, or other devices, may be configured such that, if the sample is a sync sample, all parameter sets needed for decoding the sample are included either in the sample entry for the sample or in the sample itself. Video decoder 30 may then decode the video data of the sample based on the determined parameter set data (186). The previous sync sample may be the most recent sync sample in decoding order. In some examples, video decoder 30 may discard previously stored parameter sets upon receipt of a new sync sample.

Figure 6:
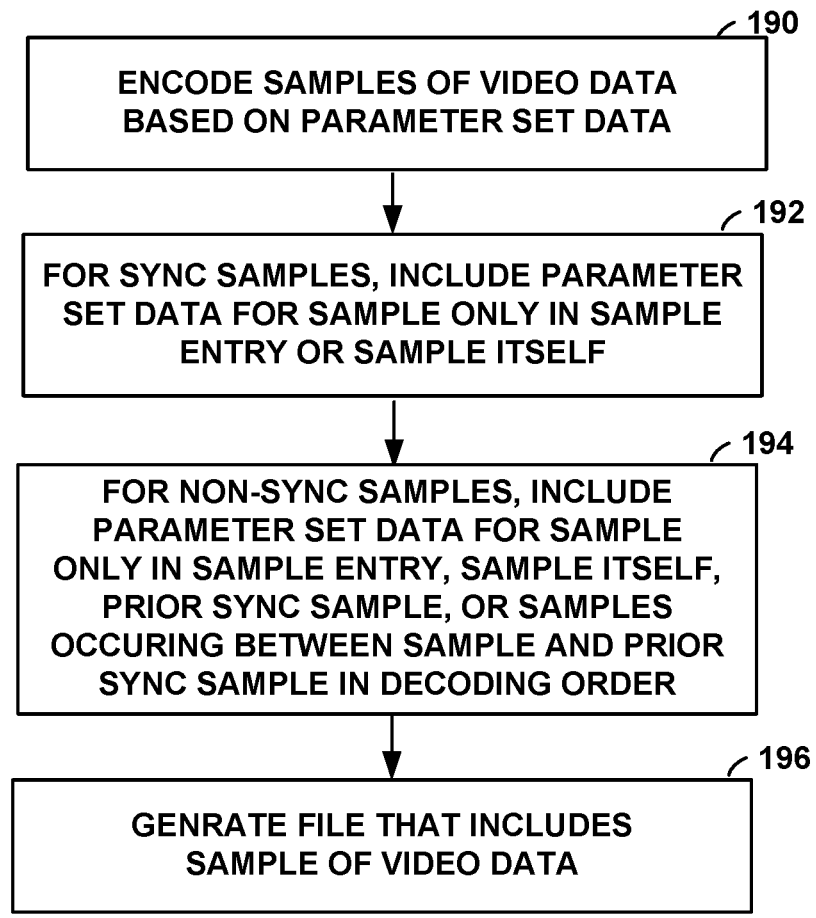
FIG. 6 is a flow diagram illustrating a process for encoding parameter set data in a video bitstream.

FIG. 6 is a flow diagram illustrating a process for encoding parameter set data in a video bitstream. While described with respect to video encoder 20 (FIGS. 1 and 2) for purposes of illustration, it should be understood that the process of FIG. 6, or portions thereof, may also be executed by encapsulation unit 21 (FIG. 1), post-processing entity 27 (FIG. 2), or other processing units or devices configured to generate, encode and/or process video data. For example, encapsulation unit 21 or post-processing entity 27 may perform techniques for including parameter set data for decoding samples in particular locations, as described in this disclosure and illustrated in FIG. 6.

In the example of FIG. 6, video encoder 20 may encode samples of video data based on parameter set data for the samples (190). An encoded sample may correspond to an access unit of video data. Video encoder 20 may encode samples of the one or more samples as sync samples or non-sync samples, as defined by a particular video coding standard. Video encoder 20 may generate a bitstream that contains the samples to ensure conformance to the particular video coding standard. For a sync sample defined based on the constraints set forth in Section 4.8 (AVC), Section 6.5.5 (SVC), Section 7.5.3 (MVC) and Section 8.4.3 (HEVC) of the ISOBMFF, video encoder 20 or another device may include all parameter set data, needed for decoding the sync sample, in the sample entry corresponding to the sync sample or in the sync sample itself (192). In this manner, video encoder 20 or another device may include parameter set data, for use in decoding the sync sample, only in the sample entry corresponding to the sync sample or in the sync sample itself.

For a non-sync sample, as defined based on the constraints set forth in Section 4.8 (AVC), Section 6.5.5 (SVC), Section 7.5.3 (MVC) and Section 8.4.3 (HEVC) of the ISOBMFF, video encoder 20 or another device may include all parameter set data for the non-sync sample in the sample entry corresponding to the non-sync sample, in the non-sync sample itself, in a prior sync sample that is prior to the non-sync sample in decoding order, or in samples occurring before the non-sync sample and after the prior sync sample in decoding order (194). In this manner, video encoder 20 or another device may include parameter set data, for use in decoding the sync sample, only in the sample entry corresponding to the non-sync sample, the non-sync sample itself, a prior sync sample in decoding order, or in samples occurring before the non-sync sample and after the prior sync sample in decoding order. Accordingly, video encoder 20 may constrain parameter set data for the sample to certain locations such that video decoder 30 may not decode parameter set data for a non-sync sample from any location other than the sample entry corresponding to the non-sync sample, the non-sync sample itself, a previous sample coded as a sync sample, or one or more samples that occur prior to the non-sync sample in decoding order but follow the previous sample coded as a sync sample in decoding order. In other words, for a current sample that is not a sync sample, video encoder 20 may encode parameter set data only in the sample entry or in any of the samples since the previous sync sample to the current sample, inclusive, i.e., including the sample or samples after the previous sync sample but before the current non-sync sample, and including the current non-sync sample and the previous sync sample.

Video encoder 20 may then generate a file that includes the sample of video data (196). The samples in the file may include sync samples and/or non-sync samples as described above. The file may include multiple samples, including one or more sync samples and one or more non-sync samples. In this manner, FIG. 6 describes an example of the operation of video encoder 20 or another device to determine whether a sample of video data is a sync sample, and, based on determining that the sample is not a sync sample (i.e., is a non-sync sample), include parameter set data for the video data only in the sample entry for the non-sync sample, in the non-sync sample itself, in a sample that is prior to the non-sync sample in decoding order and is a sync sample, or in one or more samples occurring in decoding order between the non-sync sample and the previous sample in decoding order that is a sync sample. Likewise, FIG. 6 illustrates an example of the operation of video encoder 20 or another device to determine whether a second sample of video data is a sync sample, and based on determining that the second sample is a sync sample, include parameter set data for the video data only in the sample entry for the sync sample or in the sync sample. In some examples, video encoder 20 may further avoid encoding a sync sample and subsequent samples (in coding order) with reference to parameter sets (e.g., PPSs and SPSs) that were encoded prior to the sync sample in coding order.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

A video coder, as described in this disclosure, may refer to a video encoder or a video decoder. Similarly, a video coding unit may refer to a video encoder or a video decoder. Likewise, video coding may refer to video encoding or video decoding, as applicable.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    accessing in a file, a track of the video data, wherein the track comprises a sequence of samples;
    determining whether a sample of the sequence of samples is a sync sample, wherein determining whether the sample of the sequence of samples is a sync sample comprises determining whether video coding layer (VCL) network abstraction layer (NAL) units of the sample indicate that a coded picture contained in the sample is an Instantaneous Decoding Refresh (IDR) picture, a Clean Random Access (CRA) picture, or a Broken Link Access (BLA) picture;
    in response to determining that the sample is not a sync sample, determining parameter set data for the video data of the sample in accordance with a bitstream constraint, the bitstream constraint requiring that the parameter set data be located only in particular locations in the file and not be located at locations other than the particular locations, the particular locations in the file consisting of a sample entry that includes a description of a configuration for the sample, the sample, a previous sample in decoding order that is a sync sample, and a sample occurring in decoding order between the sample and the previous sample in decoding order that is the sync sample, wherein the parameter set data comprises one or more non-VCL NAL units that include at least one of picture parameter set data or sequence parameter set data, wherein each of the particular locations in the file corresponds to a particular box within the file, each box in the file including a box type identifier and payload data; and decoding the video data based on the determined parameter set data.

2. The method of claim 1, further comprising determining whether a second sample of the sequence of samples is a sync sample; and in response to determining that the second sample is a sync sample, determining parameter set data for the video data of the second sample only from one or more second particular locations in the file, the one or more second particular locations in the file consisting of a sample entry for the second sample and the second sample.

3. The method of claim 1, wherein the sample conforms to at least one of High Efficiency Video Coding (HEVC), High Efficiency Scalable Video Coding (SHVC), Multiview High Efficiency Video Coding (MV-HEVC), Advanced Video Coding (AVC), Scalable Video Coding (SVC), and Multiview Video Coding (MVC).

4. The method of claim 1, further comprising decoding the video data of the sample based on the determined parameter set data.

5. The method of claim 1, wherein determining parameter set data comprises determining the parameter set data in response to determining that the sample is not a sync sample and based on a sample entry name associated with the sample.

6. A method for encoding video data, the method comprising:

storing in a file, a track of the video data, wherein the track comprises a sequence of samples;

determining whether a sample of the sequence of samples is a sync sample, wherein determining whether the sample of the sequence of samples is a sync sample comprises determining whether video coding layer (VCL) network abstraction layer (NAL) units of the sample indicate that a coded picture contained in the sample is an Instantaneous Decoding Refresh (IDR) picture, a Clean Random Access (CRA) picture, or a Broken Link Access (BLA) picture;

in response to determining that the sample is not a sync sample, including parameter set data for the video data in accordance with a bitstream constraint, the bitstream constraint requiring that the parameter set data be located only in particular locations in the file and not be located at locations other than the particular locations, the particular locations in the file consisting of a sample entry that includes a description of a configuration for the sample, the sample, a previous sample in decoding order that is a sync sample, and a sample occurring in decoding order between the sample and the previous sample in decoding order that is a sync sample, wherein the parameter set data comprises one or more non-VCL NAL units that include at least one of picture parameter set data or sequence parameter set data, wherein each of the particular locations in the file corresponds to a particular box within the file, each box in the file including a box type identifier and payload data; and encoding the video data based on the determined parameter set data.

7. The method of claim 6, further comprising determining whether a second sample of the sequence of samples is a sync sample; and in response to determining that the second sample is a sync sample, including parameter set data for the video data of the second sample only in one or more second particular locations in the file, the one or more second particular locations in the file consisting of a sample entry for the second sample and the second sample.

8. The method of claim 6, wherein the sample conforms to at least one of High Efficiency Video Coding (HEVC), High Efficiency Scalable Video Coding (SHVC), Multiview High Efficiency Video Coding (MV-HEVC), Advanced Video Coding (AVC), Scalable Video Coding (SVC), and Multiview Video Coding (MVC).

9. The method of claim 6, further comprising encoding the video data of the sample based on the parameter set data.

10. The method of claim 6, wherein including parameter set data comprises including the parameter set data in response to determining that the sample is not a sync sample and based on a sample entry name associated with the sample.

11. A device for decoding video data, the device comprising:

a memory configured to store video data; and one or more processors configured to:

accessing in a file, a track of the video data, wherein the track comprises a sequence of samples;

determine whether a sample of the sequence of samples is a sync sample, wherein to determine whether the sample of the sequence of samples is a sync sample, the one or more processors are further configured to determine whether video coding layer (VCL) network abstraction layer (NAL) units of the sample indicate that a coded picture contained in the sample is an Instantaneous Decoding Refresh (IDR) picture, a Clean Random Access (CRA) picture, or a Broken Link Access (BLA) picture;

in response to determining that the sample is not a sync sample, determine parameter set data for the video data of the sample in accordance with a bitstream constraint, the bitstream constraint requiring that the parameter set data be located only in particular locations in the file and not be located at locations other than the particular locations, the particular locations in the file consisting of a sample entry that includes a description of a configuration for the sample, the sample, a previous sample in decoding order that is a sync sample, and a sample occurring in decoding order between the sample and the previous sample in decoding order that is the sync sample, wherein the parameter set data comprises one or more non-VCL NAL units that include at least one of picture parameter set data or sequence parameter set data, wherein each of the particular locations in the file corresponds to a particular box within the file, each box in the file including a box type identifier and payload data; and decode the video data based on the determined parameter set data.

12. The device of claim 11, wherein the one or more processors are configured to:
  determine whether a second sample of the sequence of samples is a sync sample; and
  in response to determining that the second sample is a sync sample, determine parameter set data for the video data of the second sample only from one or more second particular locations in the file, the one or more second particular locations in the file consisting of a sample entry for the second sample and the second sample.

13. The device of claim 11, wherein the sample conforms to at least one of High Efficiency Video Coding (HEVC), High Efficiency Scalable Video Coding (SHVC), Multiview High Efficiency Video Coding (MV-HEVC), Advanced Video Coding (AVC), Scalable Video Coding (SVC), and Multiview Video Coding (MVC).

14. The device of claim 11, wherein, to determine parameter set data, the one or more processors are configured to determine the parameter set data in response to determining that the sample is not a sync sample and based on a sample entry name associated with the sample.

15. The device of claim 11, wherein the one or more processors are configured to decode the video data of the sample based on the parameter set data.

16. The device of claim 11, wherein the device comprises at least one of:
  an integrated circuit;
  a microprocessor; and
  a wireless communication device that includes a video decoder.

17. The device of claim 11, further comprising a display configured to display the video data.

18. A device for encoding video data, the device comprising:
  a memory configured to store video data; and
  one or more processors configured to:
    store in a file, a track of the video data, wherein the track comprises a sequence of samples;
    determine whether a sample of the sequence of samples is a sync sample, wherein to determine whether the sample of the sequence of samples is a sync sample, the one or more processors are further configured to determine whether video coding layer (VCL) network abstraction layer (NAL) units of the sample indicate that a coded picture contained in the sample is an Instantaneous Decoding Refresh (IDR) picture, a Clean Random Access (CRA) picture, or a Broken Link Access (BLA) picture;
    in response to determining that the sample is not a sync sample, including parameter set data for the video data in accordance with a bitstream constraint, the bitstream constraint requiring that the parameter set data be located only in particular locations in the file and not be located at locations other than the particular locations, the particular locations in the file consisting of a sample entry that includes a description of a configuration for the sample, the sample, a previous sample in decoding order that is a sync sample, and a sample occurring in decoding order between the sample and the previous sample in decoding order that is a sync sample, wherein the parameter set data comprises one or more non-VCL NAL units that include at least one of picture parameter set data or sequence parameter set data, wherein each of the particular locations in the file corresponds to a particular box within the file, each box in the file including a box type identifier and payload data; and
    encode the video data based on the determined parameter set data.

19. The device of claim 18, wherein the one or more processors are configured to:
  determine whether a second sample of the sequence of samples is a sync sample; and
  in response to determining that the second sample is a sync sample, include parameter set data for the video data of the second sample only in one or more second particular locations in the file, the one or more second particular locations in the file consisting of a sample entry for the second sample and the second sample.

20. The device of claim 18, wherein the sample conforms to at least one of High Efficiency Video Coding (HEVC), High Efficiency Scalable Video Coding (SHVC), Multiview High Efficiency Video Coding (MV-HEVC), Advanced Video Coding (AVC), Scalable Video Coding (SVC), and Multiview Video Coding (MVC).

21. The device of claim 18, wherein, to include parameter set data, the one or more processors are configured to include the parameter set data in response to determining that the sample is not a sync sample and based on a sample entry name associated with the sample.

22. The device of claim 18, wherein the one or more processors are configured to encode the video data of the sample based on the parameter set data.

23. The device of claim 18, wherein the device comprises at least one of:
  an integrated circuit;
  a microprocessor; and
  a wireless communication device that includes a video encoder.

24. The device of claim 18, further comprising a camera configured to obtain the video data.

25. A device for decoding video data, the device comprising:
  means for accessing in a file, a track of the video data, wherein the track comprises a sequence of samples;
  means for determining whether a sample of the sequence of samples is a sync sample, wherein the means for determining whether the sample of the sequence of samples is a sync sample means for determining whether video coding layer (VCL) network abstraction layer (NAL) units of the sample indicate that a coded picture contained in the sample is an Instantaneous Decoding Refresh (IDR) picture, a Clean Random Access (CRA) picture, or a Broken Link Access (BLA) picture;
  means for determining parameter set data for the video data in accordance with a bitstream constraint in response to determining that the sample is not a sync sample, the bitstream constraint requiring that the parameter set data be located only in particular locations in the file and not be located at locations other than the particular locations, the particular locations in the file consisting of a sample entry that includes a description of a configuration for the sample, the sample, a previous sample in decoding order that is a sync sample, and a sample occurring in decoding order between the sample and the previous sample in decoding order that is a sync sample, wherein the parameter set data comprises one or more non-VCL NAL units that include at least one of picture parameter set data or sequence parameter set data, wherein each of the particular locations in the file corresponds to a particular box within the file, each box in the file including a box type identifier and payload data; and means for decoding the video data based on the determined parameter set data.

26. The device of claim 25, further comprising means for determining whether a second sample of the sequence of samples is a sync sample; and means for determining parameter set data for the video data of the second sample only from one or more second particular locations in the file in response to determining that the second sample is a sync sample, the one or more second particular locations in the file consisting of a sample entry for the second sample and the second sample.

27. The device of claim 25, further comprising means for decoding the video data of the sample based on the parameter set data.

28. A device for encoding video data, the device comprising:

means for accessing in a file, a track of the video data, wherein the track comprises a sequence of samples;

means for determining whether a sample of the sequence of samples is a sync sample, wherein the means for determining whether the sample of the sequence of samples is a sync sample means for determining whether video coding layer (VCL) network abstraction layer (NAL) units of the sample indicate that a coded picture contained in the sample is an Instantaneous Decoding Refresh (IDR) picture, a Clean Random Access (CRA) picture, or a Broken Link Access (BLA) picture;

means for including parameter set data for the video data in accordance with a bitstream constraint in response to determining that the sample is not a sync sample, the bitstream constraint requiring that the parameter set data be located only in particular locations in the file and not be located at locations other than the particular locations, the particular locations in the file consisting of a sample entry that includes a description of a configuration for the sample, the sample, a previous sample in decoding order that is a sync sample, and a sample occurring in decoding order between the sample and the previous sample in decoding order that is a sync sample, wherein the parameter set data comprises one or more non-VCL NAL units that include at least one of picture parameter set data or sequence parameter set data, wherein each of the particular locations in the file corresponds to a particular box within the file, each box in the file including a box type identifier and payload data; and means for encoding the video data based on the determined parameter set data.

29. The device of claim 28, further comprising means for determining whether a second sample of the sequence of samples is a sync sample; and means for including parameter set data for the video data of the second sample only from one or more second particular locations in the file in response to determining that the second sample is a sync sample, the one or more second particular locations in the file consisting of a sample entry for the second sample and the second sample.

30. The device of claim 28, further comprising means for encoding the video data of the sample based on the parameter set data.

31. A non-transitory computer-readable medium having instructions stored thereon that, when executed, cause one or more processors to:

access in a file, a track of the video data, wherein the track comprises a sequence of samples;

determine whether a sample of the sequence of samples is a sync sample, wherein to determine whether the sample of the sequence of samples is a sync sample, the instructions cause the one or more processors to determine whether video coding layer (VCL) network abstraction layer (NAL) units of the sample indicate that a coded picture contained in the sample is an Instantaneous Decoding Refresh (IDR) picture, a Clean Random Access (CRA) picture, or a Broken Link Access (BLA) picture;

determine parameter set data for the video data in accordance with a bitstream constraint in response to determining that the sample is not a sync sample, the bitstream constraint requiring that the parameter set data be located only in particular locations in the file and not be located at locations other than the particular locations, the particular locations in the file consisting of a sample entry that includes a description of a configuration for the sample, the sample, a previous sample in decoding order that is a sync sample, and a sample occurring in decoding order between the sample and the previous sample in decoding order that is a sync sample, wherein the parameter set data comprises one or more non-VCL NAL units that include at least one of picture parameter set data or sequence parameter set data, wherein each of the particular locations in the file corresponds to a particular box within the file, each box in the file including a box type identifier and payload data; and decode the video data based on the determined parameter set data.

32. The non-transitory computer-readable medium of claim 31, wherein the instructions cause the one or more processors to determine whether a second sample of the sequence of samples is a sync sample, and in response to determining that the second sample is a sync sample, determine parameter set data for the video data of the second sample only from one or more second particular locations in the file, the one or more second particular locations in the file consisting of a sample entry for the second sample and the second sample.

33. The non-transitory computer-readable medium of claim 31, wherein the instructions cause the one or more processors to decode the video data of the sample based on the parameter set data.

34. A non-transitory computer-readable medium having instructions stored thereon that, when executed, cause one or more processors to:

store in a file, a track of the video data, wherein the track comprises a sequence of samples;

determine whether a sample of the sequence of samples is a sync sample, wherein to determine whether the sample of the sequence of samples is a sync sample, the instructions cause the one or more processors to determine whether video coding layer (VCL) network abstraction layer (NAL) units of the sample indicate that a coded picture contained in the sample is an Instantaneous Decoding Refresh (IDR) picture, a Clean Random Access (CRA) picture, or a Broken Link Access (BLA) picture;

in response to determining that the sample is not a sync sample, include parameter set data for the video data in accordance with a bitstream constraint, the bitstream constraint requiring that the parameter set data be located only in particular locations in the file and not be located at locations other than the particular locations, the particular locations in the file consisting of a sample entry that includes a description of a configuration for the sample, the sample, a previous sample in decoding order that is a sync sample, and a sample occurring in decoding order between the sample and the previous sample in decoding order that is a sync sample, wherein the parameter set data comprises one or more non-VCL NAL units that include at least one of picture parameter set data or sequence parameter set data, wherein each of the particular locations in the file corresponds to a particular box within the file, each box in the file including a box type identifier and payload data; and encoding the video data based on the determined parameter set data.

35. The non-transitory computer-readable medium of claim 34, wherein the instructions cause the one or more processors to determine whether a second sample of the sequence of samples is a sync sample, and in response to determining that the second sample is a sync sample, include parameter set data for the video data of the second sample only in one or more second particular locations in the file, the one or more second particular locations in the file consisting of a sample entry for the second sample and the second sample.

36. The non-transitory computer-readable medium of claim 34, wherein the instructions cause the one or more processors to encode the video data of the sample based on the parameter set data.

* * * * *